United States Patent
Yasuda et al.

(10) Patent No.: US 9,525,591 B2
(45) Date of Patent: Dec. 20, 2016

(54) RELAY SYSTEM AND SWITCHING DEVICE

(71) Applicant: Hitachi Metals, Ltd., Minato-ku, Tokyo (JP)

(72) Inventors: Makoto Yasuda, Tsuchiura (JP); Shigeru Tsubota, Tsuchiura (JP)

(73) Assignee: Hitachi Metals, Ltd., Tokyo (JP)

(*) Notice: Subject to any disclaimer, the term of this patent is extended or adjusted under 35 U.S.C. 154(b) by 171 days.

(21) Appl. No.: 14/624,006

(22) Filed: Feb. 17, 2015

(65) Prior Publication Data
US 2015/0288559 A1 Oct. 8, 2015

(30) Foreign Application Priority Data

Apr. 3, 2014 (JP) ................................. 2014-076742

(51) Int. Cl.
H04L 12/24 (2006.01)
H04L 12/741 (2013.01)
H04L 12/939 (2013.01)
H04L 12/709 (2013.01)

(52) U.S. Cl.
CPC ......... *H04L 41/0654* (2013.01); *H04L 45/245* (2013.01); *H04L 45/745* (2013.01); *H04L 49/557* (2013.01)

(58) Field of Classification Search
None
See application file for complete search history.

(56) References Cited

U.S. PATENT DOCUMENTS

| | | | |
|---|---|---|---|
| 2011/0292931 A1 | 12/2011 | Kizawa et al. | |
| 2012/0182866 A1* | 7/2012 | Vinayagam | H04L 45/245 370/228 |
| 2014/0160919 A1* | 6/2014 | Kar | H04W 24/04 370/220 |
| 2014/0254352 A1* | 9/2014 | Natarajan | H04L 45/28 370/228 |
| 2014/0369186 A1* | 12/2014 | Ernstrom | H04L 41/0668 370/228 |
| 2015/0195125 A1* | 7/2015 | Wu | H04L 41/06 370/225 |

FOREIGN PATENT DOCUMENTS

| | | |
|---|---|---|
| JP | 2011-250185 A | 12/2011 |
| JP | 2012-209984 A | 10/2012 |
| JP | 2012-231223 A | 11/2012 |

* cited by examiner

*Primary Examiner* — Christine Duong
(74) *Attorney, Agent, or Firm* — Crowell & Moring LLP

(57) ABSTRACT

Each of MCLAG devices has a MCLAG table, a port control unit, and a relay processing unit. The MCLAG table retains one or a plurality of first ports in association with a first identifier. The port control unit controls a first port group to transmission/reception permitted state when the first port group is set to active, and controls the first port group to a transmission prohibited state when the first port group is set to standby. The relay processing unit relays a frame containing the first identifier as a destination port to the first port group when the first port group is controlled to the transmission/reception permitted state, and relays the same to a bridge port when the first port group is controlled to the transmission prohibited state.

12 Claims, 15 Drawing Sheets

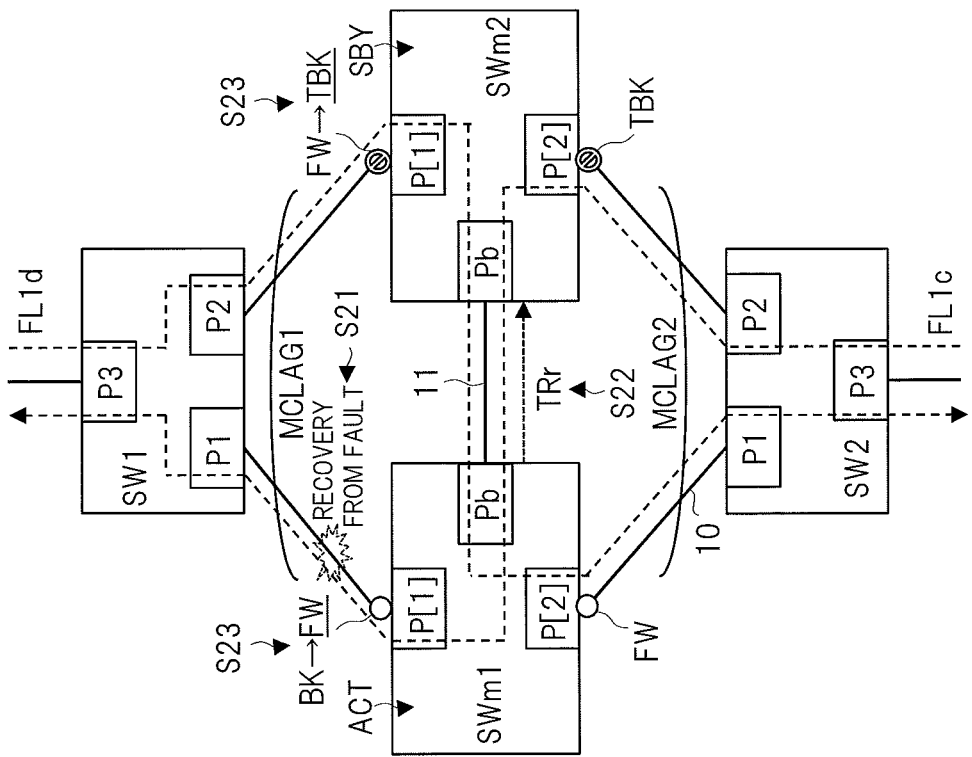
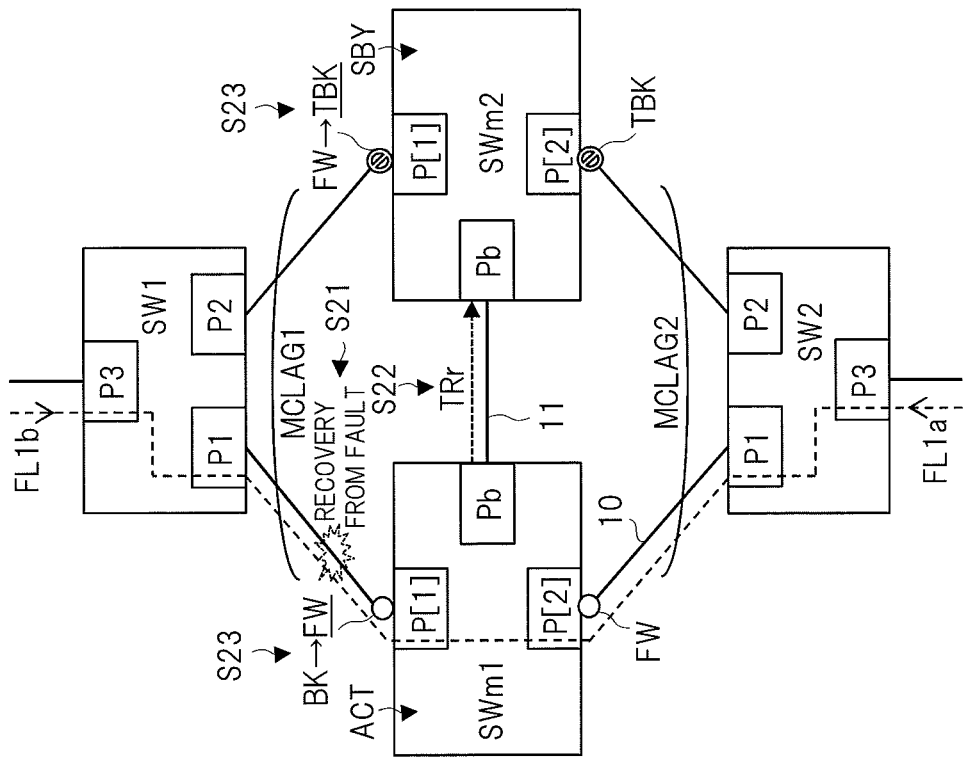
FIG. 4A
FIG. 4B

FIG. 8A

FDB: ADDRESS TABLE

| MAC ADDRESS | VLAN ID | PORT ID/MCLAG ID |
|---|---|---|
| MA1 | xxx | {MCLAG1} |
| MA2 | xxx | {MCLAG2} |
| ... | ... | ... |
| MAm | xxx | {P[m]} |
| ... | ... | ... |

FIG. 8B

27: FAULT MONITORING TABLE

| MONITORING SUBJECT | FAULT STATE |
|---|---|
| {MCLAG1}{SWm1} | FAULT |
| {P[1]}{SWm2} | NO FAULT |
| ... | ... |
| {Pb} | NO FAULT |
| ... | ... |

FIG. 8C

28: PORT CONTROL TABLE

| MCLAGID | CONTROL STATE |
|---|---|
| {MCLAG1} | FW |
| {MCLAG2} | TBK |
| ... | ... |

RELAY SYSTEM AND SWITCHING DEVICE

CROSS-REFERENCE TO RELATED APPLICATION

The present application claims priority from Japanese Patent Application No. 2014-076742 filed on Apr. 3, 2014, the content of which is hereby incorporated by reference into this application.

TECHNICAL FIELD OF THE INVENTION

The present invention relates to a relay system and a switching device, for example, a relay system to which a device-level redundancy using two switching devices is applied.

BACKGROUND OF THE INVENTION

Japanese Patent Application Laid-Open Publication No. 2011-250185 (Patent Document 1) discloses a network system in which an inter-device link aggregation is set on each link between one network device and two network devices. When a fault occurs on a dedicated line connecting two network devices, an alternative path is established by using the link aggregation path. Also, two network devices are operated as an active system and a standby system for a control plane such as synchronization of path information between the devices, and are both used in an active state for a data plane.

Japanese Patent Application Laid-Open Publication No. 2012-209984 (Patent Document 2) discloses a configuration in which an inter-device link aggregation is set on each link between a customer edge in a user network and two provider edges in a MPLS network. When both of the two provider edges receive a packet from a different provider edge, only one of the two provider edges relays the packet to the customer edge based on a rule made in advance between the two provider edges.

Japanese Patent Application Laid-Open Publication No. 2012-231223 (Patent Document 3) discloses an access system in which a link is provided each between a user L2 switch and an active L2 switch and between the user L2 switch and a reserve L2 switch. In a normal situation, the reserve L2 switch controls a port serving as a connection source of the link to the user L2 switch to a link-down state. The user L2 switch transmits a broadcast frame such as an ARP to the active L2 switch and the reserve L2 switch, thereby automatically establishing a path bypassing the port controlled to the link-down state in the reserve L2 switch.

SUMMARY OF THE INVENTION

For example, an active/standby system typified by ESRP (Extreme Standby Router Protocol) and VSRP (Virtual Switch Redundancy Protocol) has been known as a device-level redundancy using layer 2 (hereinafter, abbreviated as "L2") switching devices which carry out the L2 processes. In such a system, when a fault occurs on a link between a user L2 switching device and an active L2 switching device, the user L2 switching device usually flushes a FDB (Forwarding DataBase) in order to switch the path to a link between the user L2 switching device and a standby L2 switching device. This may lead to communication congestion or the like due to flooding.

For the solution of such a problem, for example, the system using inter-device link aggregation group (hereinafter, abbreviated as "LAG") as described in the Patent Document 1 and the Patent Document 2 is considered. In this case, since the user L2 switching device virtually manages ports, on which the LAG is set, as a single port on the FDB, it is not necessary to perform the flushing of the FDB when a fault occurs.

Here, a configuration in which a user switching device [1] is connected to two L2 switching devices, to which an inter-device LAG is applied, via an inter-device LAG [1] and a user switching device [2] is connected thereto via an inter-device LAG [2], respectively is assumed. When a frame is transmitted from the switching device [1] to the switching device [2], the switching device [1] usually distributes frame transmission destinations to the two L2 switching devices based on a predetermined distribution rule. The two L2 switching devices which have received the frame transmit the frame to the switching device [2] in a properly distributed manner.

Meanwhile, a communication carrier, etc. desire to implement detailed network management including frame transfer paths in some cases. However, when the above-mentioned two L2 switching devices to which the inter-device LAG is applied are disposed in such a carrier network, network management may become complicated. Specifically, as described above, since frame transfer from the switching device [1] to the switching device [2] via the two L2 switching devices may take various paths due to the distributed transmission, it is not easy to sufficiently grasp the transfer paths. Such a problem becomes severer as the number of incorporated user switching devices increases like in a carrier network.

The present invention has been made in view of the problem above, and an object thereof is to provide a relay system and a switching device using a device-level redundancy and being capable of facilitating the network management.

The above and other objects and novel characteristics of the present invention will be apparent from the description of the present specification and the accompanying drawings.

The following is a brief description of an outline of the typical embodiment of the invention disclosed in the present application.

A relay system according to the embodiment includes first to third switching devices. Each of the first and second switching devices has a first port group made up of one or a plurality of first ports, a second port and a bridge port, and the first switching device and the second switching device are connected to each other by a communication line via the bridge ports. The third switching device is connected to the one or the plurality of first ports of the first switching device and the one or the plurality of first ports of the second switching device via different communication lines, and the third switching device sets a link aggregation group on ports serving as connection sources of the communication lines. Here, each of the first switching device and the second switching device includes: a MCLAG table, a port control unit, and a relay processing unit. The MCLAG table retains the one or the plurality of first ports in association with a first identifier. The port control unit controls the first port group to a first state in which transmission and reception are both permitted when no fault is present and the first port group is set to active and controls the first port group to a second state in which reception is permitted but transmission is prohibited when no fault is present and the first port group is set to standby. The relay processing unit relays a frame containing the first identifier as a destination port to the first port group when the first port group is controlled to the first state and relays a frame containing the first identifier as a destination port to the bridge port when the first port group is controlled to the second state. Also, the first port group of the first switching device is set to the active and the first port group of the second switching device is set to the standby. When no fault is present, a frame containing the first identifier as a destination port and received at the second port of the first switching device is relayed to the first port group of the first switching device. Also, a frame containing the first identifier as a destination port and received at the second port of the second switching device is relayed to the first port group of the first switching device via the bridge port.

The effects obtained by typical embodiments of the invention disclosed in the present application will be briefly described below. That is, in a relay system and a switching device using a device-level redundancy, the network management can be facilitated.

BRIEF DESCRIPTIONS OF THE DRAWINGS

FIG. 4A is an explanatory diagram schematically showing an operation example in the case of recovery from fault at a MCLAG port group in the relay system of FIG. 1;

FIG. 4B is an explanatory diagram schematically showing an operation example in the case of recovery from fault at a MCLAG port group in the relay system of FIG. 1;

FIG. 8A is a schematic diagram of a configuration example of the address table of FIG. 7;

FIG. 8B is a schematic diagram of a configuration example of a fault monitoring table of FIG. 7;

FIG. 8C is a schematic diagram of a configuration example of a port control table of FIG. 7;

DESCRIPTIONS OF THE PREFERRED EMBODIMENTS

Figure 1:
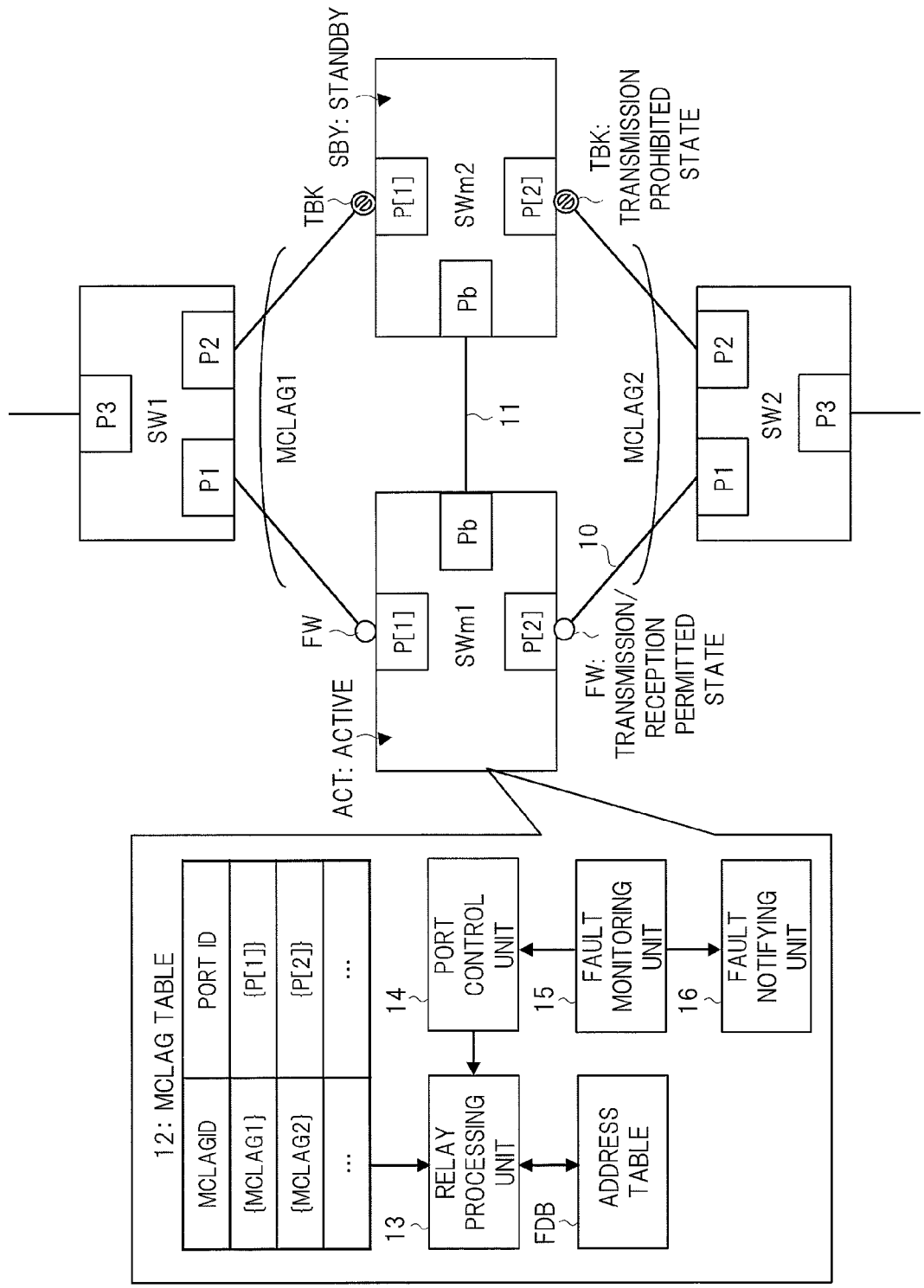
FIG. 1 is a schematic diagram of a configuration example of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<General Configuration of Relay System>>

FIG. 1 is a schematic diagram of a configuration example of a relay system according to the first embodiment of the present invention. The relay system of FIG. 1 includes two L2 switching devices (first and second switching devices) SWm1 and SWm2 to which an inter-device LAG is applied and a plurality of (here, two) user L2 switching devices SW1 and SW2.

Each of the L2 switching devices SWm1 and SWm2 has a MCLAG port group (first port group) P[1], a MCLAG group (second port group) P[2], and a bridge port Pb. The MCLAG port group P[1] is made up of one or a plurality of MCLAG ports (first ports), and the MCLAG port group P[2] is made up of one or a plurality of MCLAG ports (second ports). In the first embodiment, each of the MCLAG port groups P[1] and P[2] is made up of one MCLAG port.

Therefore, in the first embodiment, each of P[1] and P[2] represents both of the MCLAG port group and the MCLAG port.

The L2 switching device (first switching device) SWm1 and the L2 switching device (second switching device) SWm2 are connected through a communication line 11 via the bridge ports Pb. The communication line 11 is provided as, for example, a dedicated line or sometimes provided as an ordinary communication line (e.g., Ethernet (registered trademark) line).

The L2 switching device (third switching device) SW1 has a plurality of (here, two) LAG ports P1 and P2 and a port P3. The L2 switching device SW1 is connected to the one or the plurality of MCLAG ports (first ports) P[1] of the L2 switching device SWm1 and to the one or the plurality of MCLAG ports (first ports) P[1] of the L2 switching device SWm2 via different communication lines 10. In the example of FIG. 1, the LAG port P1 is connected to the MCLAG port P[1] of the L2 switching device SWm1, and the LAG port P2 is connected to the MCLAG port P[1] of the L2 switching device SWm2. Also, though not particularly limited, a terminal, etc. are connected to the port P3. The communication line 10 is provided as, for example, an Ethernet line.

In this case, the L2 switching device (third switching device) SW1 sets the LAG on the LAG ports P1 and P2 serving as connection sources of the communication lines 10 between the L2 switching device SW1 and the L2 switching devices SWm1 and SWm2. Note that the LAG is generally applied to a plurality of communication lines between one device and another device in many cases. In this example, however, the LAG is applied to a plurality of communication lines between one device and two devices. In this specification, therefore, such an inter-device LAG is distinguished from an ordinary LAG and is referred to as multi-chassis link aggregation group (hereinafter, abbreviated as "MCLAG"). The L2 switching device SW1 thus sets a MCLAG1 on the LAG ports P1 and P2. In this specification, the two L2 switching devices SWm1 and SWm2, to which such an inter-device LAG is applied, are collectively referred to as MCLAG device.

Similarly, the L2 switching device (fourth switching device) SW2 has a plurality of (here, two) LAG ports P1 and P2 and a port P3. The L2 switching device SW2 is connected to the one or the plurality of MCLAG ports (second ports) P[2] of the L2 switching device SWm1 and to the one or the plurality of MCLAG ports (second ports) P[2] of the L2 switching device SWm2 via different communication lines 10. In the example of FIG. 1, the LAG port P1 is connected to the MCLAG port P[2] of the L2 switching device SWm1, and the LAG port P2 is connected to the MCLAG port P[2] of the L2 switching device SWm2. Though not particularly limited, a terminal, etc. are connected to the port P3. The L2 switching device SW2 sets a MCLAG2 on the LAG ports P1 and P2 serving as connection sources of the communication lines 10 between the L2 switching device SW2 and the MCLAG devices.

In this example, two user L2 switching devices are provided. However, three or more user L2 switching devices or, in some cases, only one user L2 switching device may be provided. Specifically, the MCLAG devices may be connected to three or more user L2 switching devices via different MCLAGs, or, in some cases, to only one user L2 switching device via a MCLAG. In this example, each MCLAG device has the bridge port Pb and the MCLAG ports P[1] and 2[2]. However, the MCLAG device may also have a normal port on which no MCLAG is set. For example, the L2 switching devices SWm1 and SWm2 may have the configuration in which the MCLAG ports P[2] are not MCLAG ports but are normal ports and different terminals, etc., are connected to the normal ports P[2], respectively.

Each of the L2 switching devices (first and second switching devices) SWm1 and SWm2 has a MCLAG table 12, a relay processing unit 13, an address table FDB, a port control unit 14, a fault monitoring unit 15, and a fault notifying unit 16. The MCLAG table 12 retains one or a plurality of MCLAG ports (actually, port identifiers thereof) of its own switching device in association with MCLAG identifiers.

In the example of FIG. 1, the MCLAG table 12 retains the MCLAG port (first port) P[1] ({P[1]}) in association with a MCLAG identifier (first identifier) {MCLAG1} and retains the MCLAG port (second port) P[2] ({P[2]}) in association with a MCLAG identifier (second identifier) {MCLAG2}. In this specification, for example, {AA} represents an identifier (ID) for "AA". For example, it is determined in advance that MCLAG devices commonly use each of the MCLAG identifiers {MCLAG1} and {MCLAG2}. Each L2 switching device constituting the MCLAG device determines its own MCLAG port (P[1]) (actually, port identifier ({P[1]}) thereof) to be assigned to a MCLAG identifier (e.g., {MCLAG1}) based on its own MCLAG table 12.

When no fault is present and a MCLAG port group (P[1], P[2]) is set to active ACT, the port control unit 14 controls the MCLAG port group to a transmission/reception permitted state (first state) FW in which transmission and reception are both permitted. Meanwhile, when no fault is present and a MCLAG port group (P[1], P[2]) is set to standby SBY, the port control unit 14 controls the MCLAG port group to a transmission prohibited state (second state) TBK in which reception is permitted but transmission is prohibited.

In the first embodiment, one of the two L2 switching devices SWm1 and SWm2 constituting the MCLAG devices (SWm1 in this example) is set to active ACT in units of device in advance, and the other (SWm2 in this example) is set to standby SBY in units of device in advance. The L2 switching device SWm1 set to active ACT sets all of its own MCLAG port groups (P[1] and P[2]) to active ACT, and the L2 switching device SWm2 set to standby SBY sets all of its own MCLAG port groups (P[1] and P[2]) to standby SBY. Although details will be described in another embodiment, the setting method to active ACT or standby SBY is not necessarily a setting method in units of device, but may be a setting method in units of MCLAG port group.

When no fault is present, the port control unit 14 of the L2 switching device SWm1 controls its own MCLAG port groups P[1] and P[2] to the transmission/reception permitted state (first state) FW because its own MCLAG port groups P[1] and P[2] are both set to active ACT. Meanwhile, the port control unit 14 of the L2 switching device SWm2 controls its own MCLAG port groups P[1] and P[2] to the transmission prohibited state (second state) TBK because its own MCLAG port groups P[1] and P[2] are both set to standby SBY.

When the MCLAG port groups P[1] and P[2] of its own switching device are controlled to the transmission/reception permitted state (first state) FW, the relay processing unit 13 relays a frame containing a MCLAG identifier ({MCLAG1}, {MCLAG2}) as a destination port to its own MCLAG port group corresponding to the MCLAG identifier. For example, when the MCLAG port group (first port group) P[1] of its own switching device is controlled to the transmission/reception permitted state FW (that is, in the case of the L2 switching device SWm1), the relay processing unit 13 relays a frame containing the MCLAG identifier (first identifier) {MCLAG1} as a destination port to its own MCLAG port group P[1].

Meanwhile, when the MCLAG port groups P[1] and P[2] of its own switching device are controlled to the transmission prohibited state (second state) TBK, the relay processing unit 13 relays a frame containing a MCLAG identifier ({MCLAG1}, {MCLAG2}) as a destination port to the bridge port Pb. For example, when the MCLAG port group (first port group) P[1] of its own switching device is controlled to the transmission prohibited state TBK (that is, in the case of the L2 switching device SWm2), the relay processing unit 13 relays a frame containing the MCLAG identifier (first identifier) {MCLAG1} as a destination port to the bridge port Pb.

In this case, the frame destination port is determined based on the retrieval result on the address table FDB. It is widely known that the address table FDB retains the correspondence relation between a port and a MAC (Media Access Control) address present ahead of the port. The relay processing unit 13 carries out, for example, the following process for the address table FDB.

When a port having received a frame is its own MCLAG port group (P[1], P[2]) the relay processing unit 13 determines the MCLAG identifier corresponding to the MCLAG port group to be a reception port identifier. The relay processing unit 13 then learns a source MAC address contained in the frame in association with the reception port identifier to the address table FDB. For example, when a frame is received at the MCLAG port group (first port group) P[1], the relay processing unit 13 determines the MCLAG identifier {MCLAG1} corresponding thereto to be a reception port identifier, and then learns a source MAC address contained in the frame in association with the MCLAG identifier {MCLAG1} to the address table FDB.

Also, the relay processing unit 13 retrieves a destination port corresponding to the destination MAC address contained in the frame from the address table FDB. Based on the retrieval result, when the destination port corresponding to the destination MAC address is a MCLAG identifier and the MCLAG port group of its own switching device corresponding to the MCLAG identifier is controlled to the transmission prohibited state TBK, the relay processing unit 13 relays a frame, to which a reception port identifier is added, to the bridge port Pb. For example, when the destination port corresponding to the destination MAC address is the MCLAG identifier {MCLAG2} and the MCLAG port group of its own switching device (second port group) P[2] corresponding thereto is controlled to the transmission prohibited state TBK, the relay processing unit 13 relays a frame, to which the reception port identifier {MCLAG1} is added, to the bridge port Pb.

Furthermore, when the frame to which a reception port identifier is added is received at the bridge port Pb, the relay processing unit 13 learns a source MAC address contained in the frame in association with the reception port identifier added to the frame to the address table FDB. For example, when a frame to which the reception port identifier {MCLAG1} is added is received at the bridge port Pb, the relay processing unit 13 learns a source MAC address contained in the frame in association with the reception port identifier {MCLAG1} to the address table FDB.

The fault monitoring unit 15 detects fault occurrence and recovery from fault at each of ports of its own switching device (MCLAG port groups P[1] and P[2] and bridge port Pb). Specifically, the fault monitoring unit 15 detects the fault occurrence by recognizing, for example, reduction of signal intensity of a received signal, non-detection of a pulse signal such as FLP (Past Link Pulse), or non-reception of an existence-confirming frame transmitted and received at regular intervals. When the fault monitoring unit 15 detects the fault occurrence at a MCLAG port group, the fault notifying unit 16 transmits a fault notification frame through the bridge port Pb. Also, when the fault monitoring unit 15 detects the recovery from fault at a MCLAG port group, the fault notifying unit 16 transmits a fault recovery frame through the bridge port Pb.

<<General Operation of Relay System (in the absence of Fault)>>

Figure 2A:
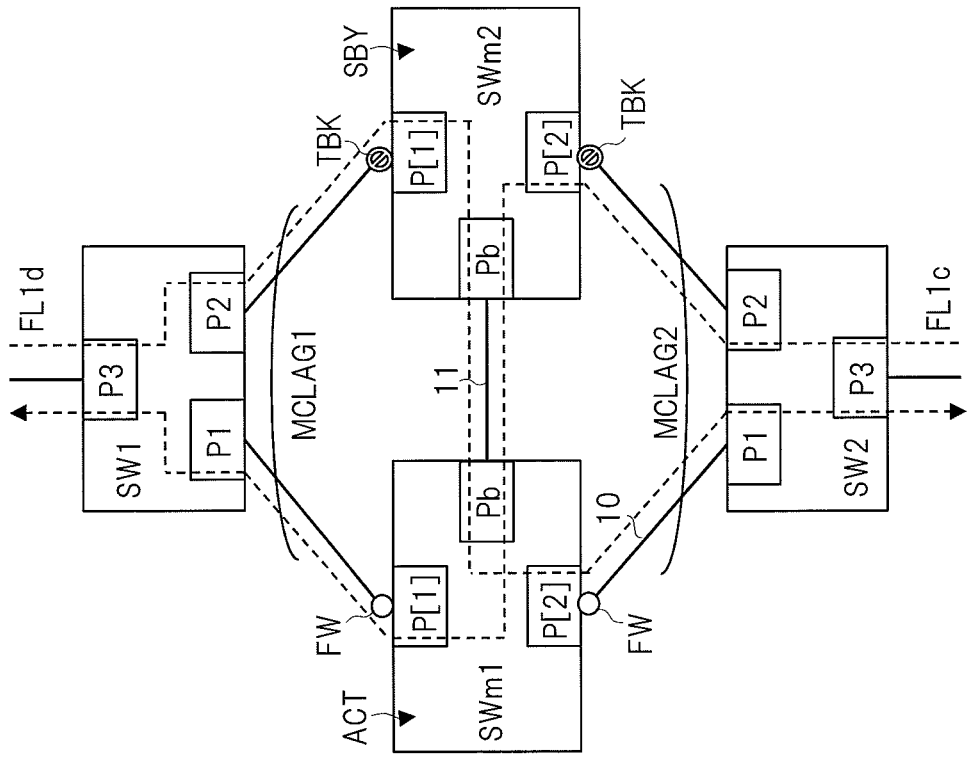
FIG. 2A is an explanatory diagram schematically showing an operation example in the absence of fault in the relay system of FIG. 1.
Figure 2B:
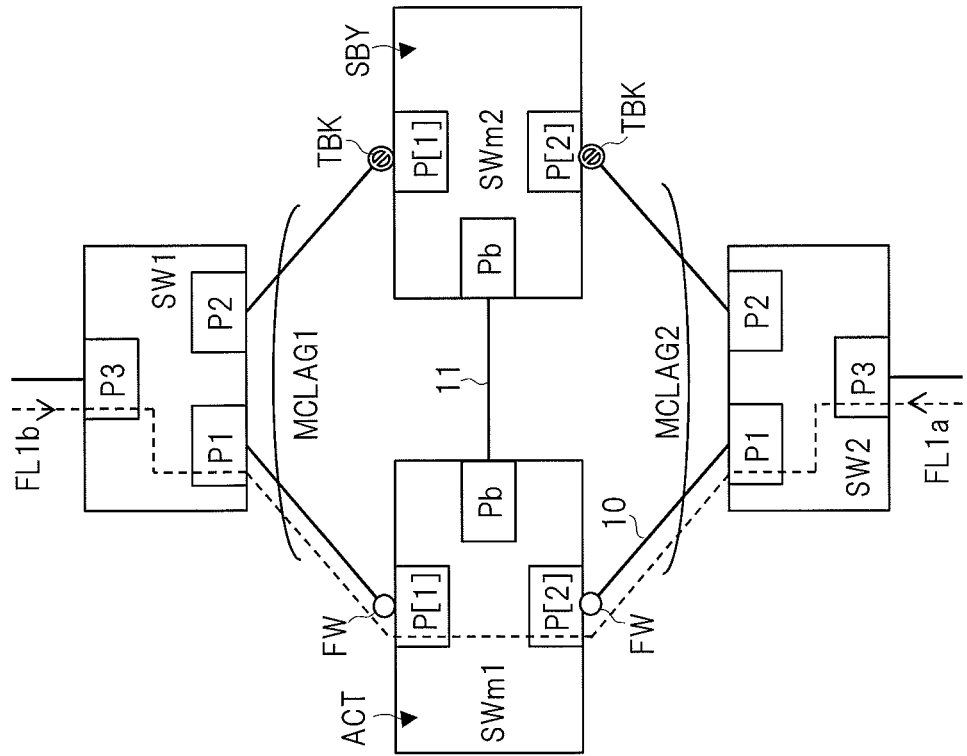
FIG. 2B is an explanatory diagram schematically showing an operation example in the absence of fault in the relay system of FIG. 1.

FIGS. 2A and 2B are explanatory diagrams schematically showing operation examples in the absence of fault in the relay system of FIG. 1. In these examples, a frame is transmitted and received between a terminal connected to the port P3 of the user L2 switching device SW1 and a terminal connected to the port P3 of the user L2 switching device SW2. First, the case in which the user L2 switching device SW2 relays a frame FL1a received at the port P3 to the LAG port P1 as shown in FIG. 2A is assumed. Specifically, the L2 switching device SW2 selects one of the LAG ports P1 and P2, on which the MCLAG2 is set, based on a predetermined distribution rule, and relays the frame FL1a to the selected LAG port (LAG port P1 in this case).

The L2 switching device SWm1 receives the frame FL1a at the MCLAG port group (MCLAG port) P[2], and learns a source MAC address of the frame FL1a in association with a reception port identifier ({MCLAG2}) to the address table FDB as described with reference to FIG. 1. Also, the L2 switching device SWm1 retrieves a destination port corresponding to a destination MAC address of the frame FL1a from the address table FDB. As the retrieval result of the destination port, the L2 switching device SWm1 acquires the MCLAG identifier {MCLAG1}.

Since its own MCLAG port group P[1] corresponding to the MCLAG identifier {MCLAG1} is controlled to the transmission/reception permitted state FW, the L2 switching device SWm1 relays the frame FL1a to the MCLAG port group (MCLAG port) P[1]. The user L2 switching device SW1 receives the frame FL1a at the LAG port P1 and relays the frame FL1a to the port P3.

Then, the case in which the user L2 switching device SW1 relays a frame FL1b received at the port P3 to the LAG port P1 in reverse based on the predetermined distribution rule is assumed. Also in this case, the L2 switching device SWm1 performs the learning of a source MAC address on the frame FL1b and the retrieval of destination port in the same manner. As the retrieval result of the destination port, the L2 switching device SWm1 acquires the MCLAG identifier {MCLAG2}. Since its own MCLAG port group P[2] corresponding to the MCLAG identifier {MCLAG2} is controlled to the transmission/reception permitted state FW, the L2 switching device SWm1 relays the frame FL1b the MCLAG port group (MCLAG port) P[2], and the user L2 switching device SW2 relays the frame FL1b to the port P3.

Next, the case in which the user L2 switching device SW2 relays a frame FL1c received at the port P3 to the LAG port P2 based on the predetermined distribution rule as shown in FIG. 2B is assumed. In this case, the L2 switching device SWm2 receives the frame FL1c at the MCLAG port group (MCLAG port) P[2], and learns a source MAC address thereof in association with a reception port identifier ({MCLAG2}) to the address table FDB.

Also, the L2 switching device SWm2 retrieves a destination port corresponding to a destination MAC address of the frame fills FL1c from the address table FDB. As the retrieval result of the destination port, the L2 switching device SWm2 acquires the MCLAG identifier {MCLAG1}. Unlike the case of FIG. 2A, since its own MCLAG port group P[1] corresponding to the MCLAG identifier {MCLAG1} is controlled to the transmission prohibited state TBK, the L2 switching device SWm2 relays the frame FL1c to the bridge port Pb. At this time, as described above with reference to FIG. 1, the L2 switching device SWm2 adds a reception port identifier ({MCLAG2}) to the frame FL1c.

The L2 switching device SWm1 receives the frame FL1c, to which the reception port identifier ({MCLAG2}) is added, at the bridge port Pb, and learns the source MAC address thereof in association with the reception port identifier ({MCLAG2}) to the address table FDB. Also, the L2 switching device SWm1 retrieves the destination port corresponding to the destination MAC address of the frame FL1c from the address table FDR, and acquires the MCLAG identifier {MCLAG1} as the retrieval result thereof. Since its own MCLAG port group P[1] corresponding to the MCLAG identifier {MCLAG1} is controlled to the transmission/reception permitted state FW, the L2 switching device SWm1 relays the frame FL1c to the MCLAG port group (MCLAG port) P[1]. The user L2 switching device SW1 receives the frame FL1c at the LAG port P1 and relays The frame FL1c to the port P3.

Then, the case in which the user L2 switching device SW1 relays a frame FL1d received at the port P3 to the LAG port P2 in reverse based on the predetermined distribution rule is assumed. Also in this case, the L2 switching device SWm2 performs the learning of a source MAC address of the frame FL1d and the retrieval of a destination port in the same manner. As the retrieval result of the destination port, the L2 switching device SWm2 acquires the MCLAG identifier {MCLAG2}. Since its own MCLAG port group P[2] corresponding to the MCLAG identifier {MCLAG2} is controlled to the transmission prohibited state TBK, the L2 switching device SWm2 relays the frame FL1d to the bridge port Pb.

The L2 switching device SWm1 performs the learning of the source MAC address and the retrieval of the destination port with respect to the frame FL1d received at the bridge port Pb. As the retrieval result of the destination port, the L2 switching device SWm1 acquires the MCLAG identifier {MCLAG2}. Since its own MCLAG port group P[2] corresponding to the MCLAG identifier {MCLAG2} is controlled to the transmission/reception permitted state FW, the L2 switching device SWm1 relays the frame FL1d to the MCLAG port group (MCLAG port) P[2], and the user L2 switching device SW2 relays the frame FL1d to the port P3.

In the case of FIG. 2B, for example, both MCLAG devices (L2 switching devices SWm1 and SWm2) perform the retrieval on the address table FDB with respect to the frame FL1c. In some cases, however, only one of the MCLAG devices may perform the retrieval on the address table FDB. Specifically, for example, the L2 switching device SWm2 having received the frame FL1c performs the retrieval on the address table FDB and relays the frame FL1c, to which the reception port identifier as well as the destination port identifier [MCLAG1] is added, to the bridge port Pb. Upon reception of the frame FL1c, the L2 switching device SWm1 relays the frame FL1c based on the destination port identifier {MCLAG1}.

As described above, when no fault is present, for example, the frame FL1a containing the MCLAG identifier (first identifier) {MCLAG1} as the destination and received at the MCLAG port (second port) P[2] of the L2 switching device (first switching device) SWm1 is relayed to the MCLAG port group (first port group) P[1] of the L2 switching device SWm1. On the other hand, for example, the frame FL1c containing the MCLAG identifier (first identifier) {MCLAG1} as the destination and received at the MCLAG port (second port) P[2] of the L2 switching device (second switching device) SWm2 is relayed to the MCLAG port group (first port group) P[1] of the L2 switching device (first switching device) SWm1 via the bridge port Pb.

In this case, the frame is always transmitted from the MCLAG port group set to active ACT in the MCLAG device (in this case P[1] of SWm1) to the L2 switching device SW1 and is not transmitted from the MCLAG port group set to standby SBY (in this case, P[1] of SWm2). Also, the same is true when the direction is reversed, and the frame is always transmitted from the MCLAG port group set to active ACT (P[2] of SWm1) to the L2 switching device SW2 and is not transmitted from the MCLAG port group set to standby SBY (P[2] of SWm2).

As a result, a frame transfer path is grasped easily and therefore the network management can be facilitated. Specifically, when a frame is monitored by, for example, port mirroring in the MCLAG device, it is only required to monitor the MCLAG port groups set to active ACT (ports P[1] and P[2] of the L2 switching device SWm1) and the MCLAG port groups set to standby SBY can be eliminated from monitoring subjects. As described above, when active ACT or standby SBY is set in units of device, it is only required to monitor the devices set to active ACT. Such a reduction in monitoring subjects is particularly advantageous when the number of user L2 switching devices to be incorporated is large like in a carrier network, etc.

According to the technique of the Patent Document 1, both are operated in an active state for the data plane, and there is no distinction between active and standby for the MCLAG port groups like in the first embodiment. Also, the technique of the Patent Document 2 is the technique of controlling a transfer path by defining an action with respect to the combination of a source address and a destination address based on the MPLS network, and this is essentially different from the method of the first embodiment. Furthermore, the technique of the Patent Document 3 does not use the LAG, and in this case, flushing of the FDB may be required when a fault occurs as described above.

<<General Operation of Relay System (in the occurrence of fault at MCLAG port group>>

Figure 3:
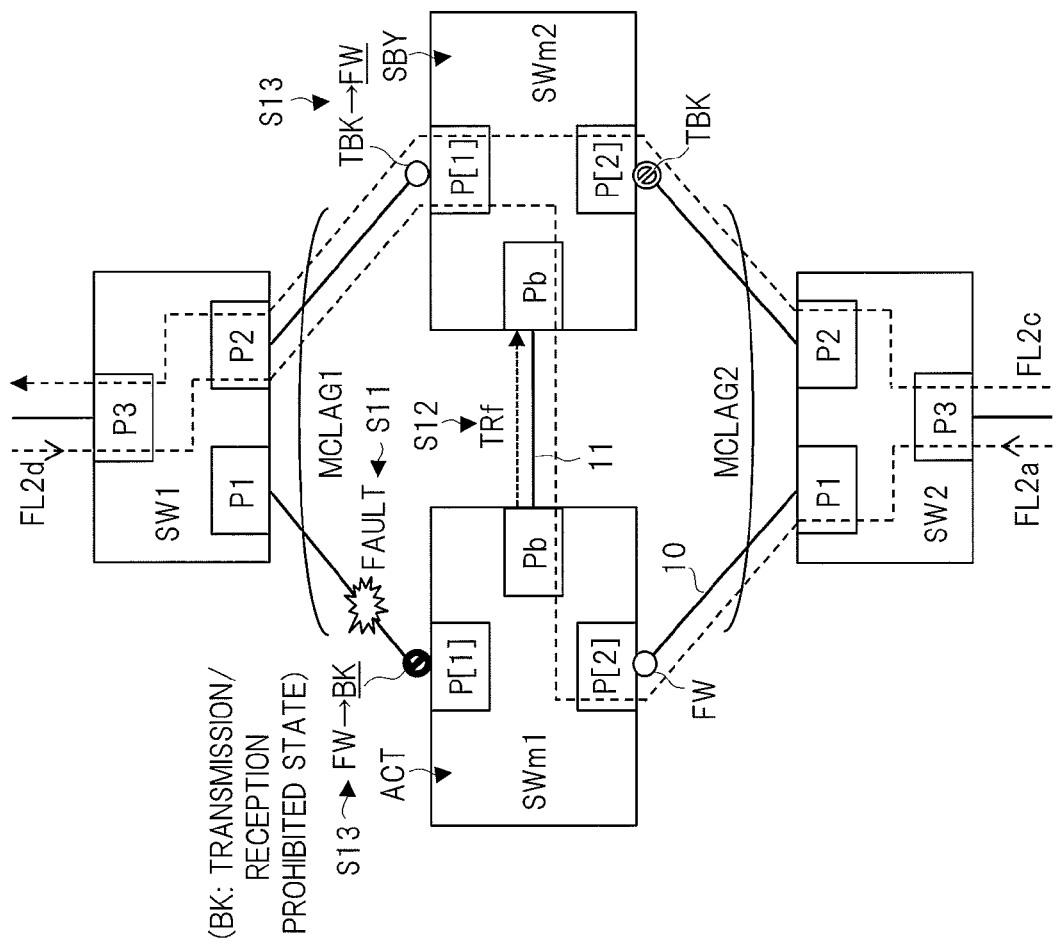
FIG. 3 is an explanatory diagram schematically showing an operation example in the occurrence of fault at a MCLAG port group in the relay system of FIG. 1.

FIG. 3 is an explanatory diagram schematically showing an operation example in the occurrence of fault at a MCLAG port group in the relay system of FIG. 1. Here, the case where a fault occurs on the communication line 10 connected to the MCLAG port P[1] of the L2 switching device SWm1 in the state of the absence of fault shown in FIG. 2A and FIG. 2B is taken as an example. First, the fault monitoring unit 15 of the L2 switching device SWm1 detects a fault occurrence at the MCLAG port group (MCLAG port) P[1] (step S11). In response to the detection of the fault occurrence, the fault notifying unit 16 of the L2 switching device SWm1 transmits a fault notification frame TRf containing information of the place of the fault occurrence to the bridge port Pb (step S12).

Here, when occurrence of a fault at a MCLAG port group is detected by the fault monitoring unit 15, the port control unit 14 of FIG. 1 controls the MCLAG port group to a transmission/reception prohibited state (third. state) BK in which transmission and reception are both prohibited. Also, when the occurrence of fault at the MCLAG port group is not detected by the fault monitoring unit 15 and the fault notification frame TRf is received via the bridge port Pb, the port control unit 14 controls its own MCLAG port group constituting a MCLAG together with the place of fault occurrence contained. in the fault notification frame TRf to the transmission/reception permitted state (first state) FW. When the MCLAG port group is controlled to the transmission/reception prohibited state (third state) BK, the relay processing unit 13 shown in FIG. 1 relays a frame containing the MCLAG port group (MCLAG identifier thereof) as a destination port to the bridge port Pb.

In the example of FIG. 3, since the fault monitoring unit 15 has detected the fault occurrence at the MCLAG port group (first port group) P[1], the port control unit 14 of the L2 switching device SWm1 controls the MCLAG port group P[1] to the transmission/reception prohibited state BK from the transmission/reception permitted state FW (step S13). Meanwhile, since the fault monitoring unit 15 detects no fault occurrence at the MCLAG port groups and the fault notification frame TRf is received, the port control unit 14 of the L2 switching device SWm2 controls its own MCLAG port group P[1] constituting the MCLAG1 together with the place of fault occurrence (P[1] of SWm1) to the transmission/reception permitted state FW from the transmission prohibited state TBK (step S13).

In this situation, first, the case in which the user L2 switching device SW2 relays a frame FL2a received at the port P3 to the LAG port P1 based on the predetermined distribution rule is assumed. In this case, the L2 switching device SWm1 receives the frame FL2a at the MCLAG port group (MCLAG port) P[2] and learns a source MAC address thereof in association with a reception port identifier ({MCLAG2}) to the address table FDB.

Also, the L2 switching device SWm1 retrieves a destination port corresponding to a destination MAC address of the frame FL2a from the address table FDB. As the retrieval result of the destination port, the L2 switching device SWm1 acquires the MCLAG identifier {MCLAG1}. Since its own MCLAG port group P[1] corresponding to the MCLAG identifier {MCLAG1} is controlled to the transmission/reception prohibited state BK, the L2 switching device SWm1 relays the frame FL2a to the bridge port Pb. At this time, the L2 switching device SWm1 adds a reception port identifier ({MCLAG2}) to the frame FL2a.

The L2 switching device SWm2 receives the frame FL2a, to which the reception port identifier ({MCLAG2}) is added, at the bridge port Pb, and learns the source MAC address thereof in association with the reception port identifier ({MCLAG2}) to the address table FDB. Also, the L2 switching device SWm2 retrieves the destination port corresponding to the destination MAC address of the frame FL2a from the address table FDB, and acquires the MCLAG identifier {MCLAG1} as the retrieval result thereof. Since its own MCLAG port group P[1] corresponding to the MCLAG identifier {MCLAG1} is controlled to the transmission/reception permitted state FW, the L2 switching device SWm2 relays the frame FL2a to the MCLAG port group (MCLAG port) P[1]. The user L2 switching device SW1 receives the frame FL2a at the LAG port P2 and relays the frame FL2a to the port P3.

Next, the case in which the user L2 switching device SW2 relays a frame FL2c received at the port P3 to the LAG port P2 based on the predetermined distribution rule is assumed. In this case, the L2 switching device SWm2 receives the frame FL2c at the MCLAG port group (MCLAG port) P[2] and learns a source MAC address thereof in association with a reception port identifier ({MCLAG2}) to the address table FDB.

Also, the L2 switching device SWm2 retrieves a destination port corresponding to a destination MAC address of the frame FL2c from the address table FDB and acquires the MCLAG identifier {MCLAG1} as the retrieval result thereof. Since its own MCLAG port group P[1] corresponding to the MCLAG identifier {MCLAG1} is controlled to the transmission/reception permitted state FW, the L2 switching device SWm2 relays the frame FL2c to the MCLAG port group (MCLAG port) P[1]. The user L2 switching device SW1 receives the frame FL2c at the LAG port P2 and relays the frame FL2c to the port P3.

The path for the frame which the user L2 switching device SW1 receives at the port P3 is determined to be the same as that in the case of FIGS. 2A and 2B because the state of the MCLAG port groups P[2] of the L2 switching devices SWm1 and SWm2 of FIG. 3 is the same as the state of the MCLAG port groups P[2] of the L2 switching devices SWm1 and SWm2 of FIG. 2A and FIG. 2B. More specifically, the path for a frame FL2d relayed from the port P3 to the LAG port P2 of the L2 switching device SW1 is determined to be the same as that for the frame FL1d shown in FIG. 2B. However, since the occurrence is detected at the LAG port P1 of the L2 switching device SW1, the path for the frame FL1b shown in FIG. 2A is not created.

<<General Operation of Relay System (in the recovery from fault at MCLAG port group>>

FIGS. 4A and 4B are explanatory diagrams schematically showing operation examples in the case of recovery from fault at a MCLAG port group in the relay system of FIG. 1. Here, the case where the fault at the MCLAG port group shown in FIG. 3 is recovered is taken as an example. in FIGS. 4A and 4B, first, the fault monitoring unit 15 of the L2 switching device SWm1 detects the recovery from fault at the MCLAG port group (MCLAG port) P[1] (step S21). In response to the detection of the recovery from the fault, the fault notifying unit 16 of the L2 switching device SWm1 transmits a fault recovery frame TRr containing information of the place of recovery from fault to the bridge port Pb (step S22).

Here, when a MCLAG port group is set to active ACT and the fault monitoring unit 15 detects the recovery from fault at the MCLAG port group, the port control unit 14 of FIG. 1 controls the MCLAG port group to the transmission/reception permitted state (first state) FW. Meanwhile, when a MCLAG port group is set to standby SBY and a fault recovery frame is received via the bridge port Pb, the port control unit 14 controls its own MCLAG port group constituting a MCLAG together with a place of recovery from fault contained the fault recovery frame to the transmission prohibited state (second state) TBK.

In the example of FIGS. 4A and 4B, since the fault monitoring unit 15 has detected the recovery from fault at the MCLAG port group (first port group) P[1], the port control unit 14 of the L2 switching device SWm1 controls the MCLAG port group P[1] to the transmission/reception permitted state FW from transmission/reception prohibited state BK (step S23). Meanwhile, since the fault recovery frame TRr is received, the port control unit 14 of the L2 switching device SWm2 controls its own MCLAG port group P[1] constituting the MCLAG1 together with the place of recovery from fault (P[1] of SWm1) to the transmission prohibited stat TEK from the transmission/reception permitted state FW (step S23).

In this manner, each MCLAG port is put in the same state as that shown in FIGS. 2A and 2B. As a result, as shown in FIGS. 4A and 4B, the paths for the frames FL1a to FL1d are determined to be the same as those shown in FIGS. 2A and 2B. Although an operation example of automatically returning back to the state of FIGS. 2A and 2B in response to the recovery from fault has been described here, the operation is not limited to this and whether or not the state is returned back to that of FIGS. 2A and 2B may be determined selectively.

Specifically, for example, the MCLAG device has an automatic recovery mode and a manual recovery mode one of which can be selected in advance by an administrator, etc. In the automatic recovery mode, the MCLAG device automatically changes the state of each MCLAG port group in response to the recovery from fault as shown in FIGS. 4A and 4B. On the other hand, in the manual recovery mode, the MCLAG device changes the state of each MCLAG port group upon reception of a command input by the administrator, etc. In other words, even if recovery from fault is completed, the MCLAG device maintains the state of each MCLAG port group shown in FIG. 3 until receiving a command input. For example, when the fault shown in FIG. 3 is an unstable fault, the situation in which the state of FIG. 3 and the state of FIGS. 4A and 4B are alternately repeated may arise, but this situation can be prevented by selecting the manual recovery mode.

<<General Operation of Relay System (in the occurrence of fault at bridge port>>

Figure 5:
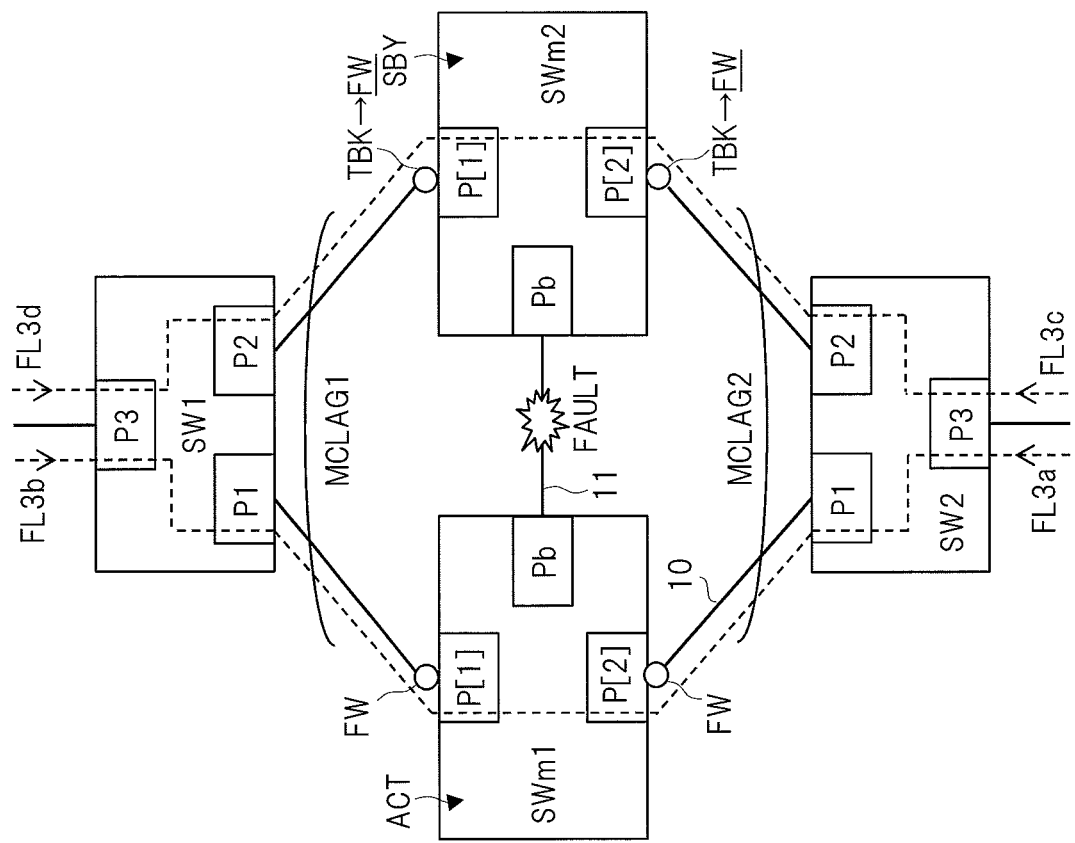
FIG. 5 is an explanatory diagram schematically showing an operation example in the occurrence of fault at the bridge port in the relay system of FIG. 1.

FIG. 5 is an explanatory diagram schematically showing an operation example in the occurrence of fault at the bridge port in the relay system of FIG. 1. Here, the case where a fault occurs on the communication line 11 connected to the bridge port Pb in the state of the absence of fault shown in FIGS. 2A and 2B is taken as an example. When the fault monitoring unit 15 detects a fault occurrence at the bridge port Pb, the port control unit 14 of FIG. 1 controls the MCLAG port groups to the transmission/reception permitted state (first state) FW.

In the example of FIG. 5, the port control unit 14 of the L2 switching device SWm2 controls the MCLAG port groups P[1] and P[2] to the transmission/reception permitted state FW from the transmission prohibited state TBK in response to the fault occurrence at the bridge port Pb. In this situation, first, the case in which the user L2 switching device SW2 relays a frame FL3a received at the port 13 to the LAG port P1 based on the predetermined distribution rule is assumed. In this case, the L2 switching device SWm1 relays the frame FL3a containing the MCLAG identifier {MCLAG1} as a destination port and received at the MCLAG port group P[2] to the MCLAG port group P[1] used on the transmission/reception permitted state FW of the MCLAG port group P[1]. The user L2 switching device SW1 relays the frame FL3a received at the LAG port P1 to the port P3.

The case in which the user L2 switching device SW1 relays a frame FL3b received at the port P3 to the LAG port 11 in reverse based on the predetermined distribution rule is assumed. Also in this case, the L2 switching device SWm1 relays the frame FL3b containing the MCLAG identifier {MCLAG2} as a destination port and received at the MCLAG port group P[1] to the MCLAG port group P[2] based on the transmission/reception permitted state FW of the MCLAG port group P[2] in the same manner. The user L2 switching device SW2 relays the frame FL3b received at the LAG port P1 to the port P3.

Next, the case in which the user L2 switching device SW2 relays a frame FL3c received at the port P3 to the LAG port P2 based on the predetermined distribution rule is assumed. In this case, the L2 switching device SWm2 relays the frame FL3c containing the MCLAG identifier or {MCLG1} as a destination port and received at the MCLAG port group P[2] to the MCLAG port group P[1] based on the transmission/reception permitted state FW of the MCLAG port group P[1]. The user L2 switching device SW1 relays the frame FL3c received at the LAG port P2 to the port P3.

The case in which the user L2 switching device SW1 relays a frame FL3d received at the port P3 to the LAG port P2 in reverse based on the predetermined distribution rule is assumed. Also in this case, the L2 switching device SWm2 relays the frame FL3d containing the MCLAG identifier {MCLAG2} as a destination port and received at the MCLAG port group P[1] to the MCLAG port group P[2] based on the transmission/reception permitted state FW of the MCLAG port group P[2] in the same manner. The user L2 switching device SW2 relays the frame FL3d received at the LAG port P2 to the port P3.

<<General Operation of Relay System (in the occurrence of fault in MCLAG device>>

Figure 6:
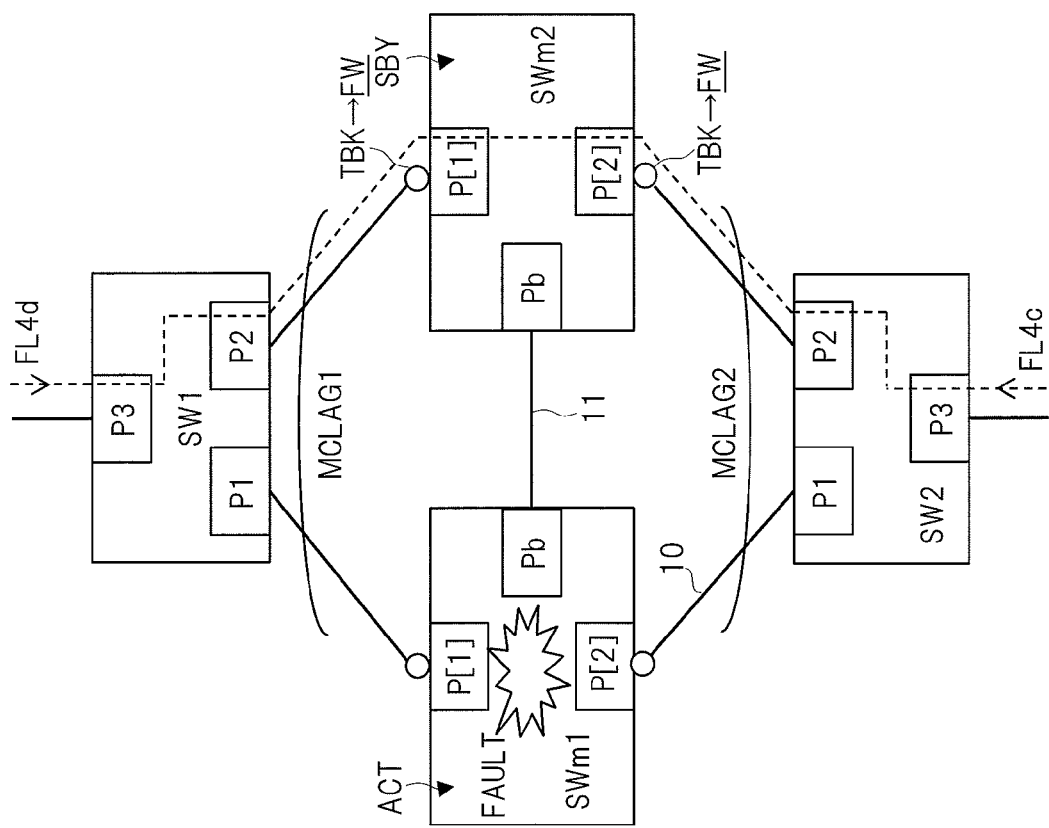
FIG. 6 is an explanatory diagram schematically showing an operation example in the occurrence of fault in one of the MCLAG devices in the relay system of FIG. 1.

FIG. 6 is an explanatory diagram schematically showing an operation example in the occurrence of fault in one of the MCLAG devices in the relay system of FIG. 1. Here, the case where a fault occurs in the L2 switching device SWm1 set to active ACT in the state of the absence of fault shown in FIGS. 2A and 2B is taken as an example. The MCLAG devices (SWm1 and SWm2) handle a fault of one of the MCLAG devices (SWm1 in this example) in the same manner as the fault at the bridge port Pb shown in FIG. 5. In other words, when a fault occurs in the L2 switching device SWm1, the L2 switching device SWm2 eventually detects the occurrence of fault at the bridge port Pb.

Therefore, paths for frames FL4c and FL4d shown in FIG. 6 are determined to be the same as the paths for the frames FL3c and FL3d shown in FIG. 5. In the case of FIG. 6, however, since the user L2 switching devices SW1 and SW2 detect the fault occurrence in the L2 switching device SWm1, the paths for the frames FL3a and FL3b shown in FIG. 5 are not created.

As described above, according to the relay system and the switching device of the first embodiment, the state of each port is properly controlled in accordance with fault occurrence situation as shown in FIGS. 3 to 6. Hence, the system availability with the inclusion of the device fault can be easily improved.

<<Configuration of Switching Device>>

Figure 7:
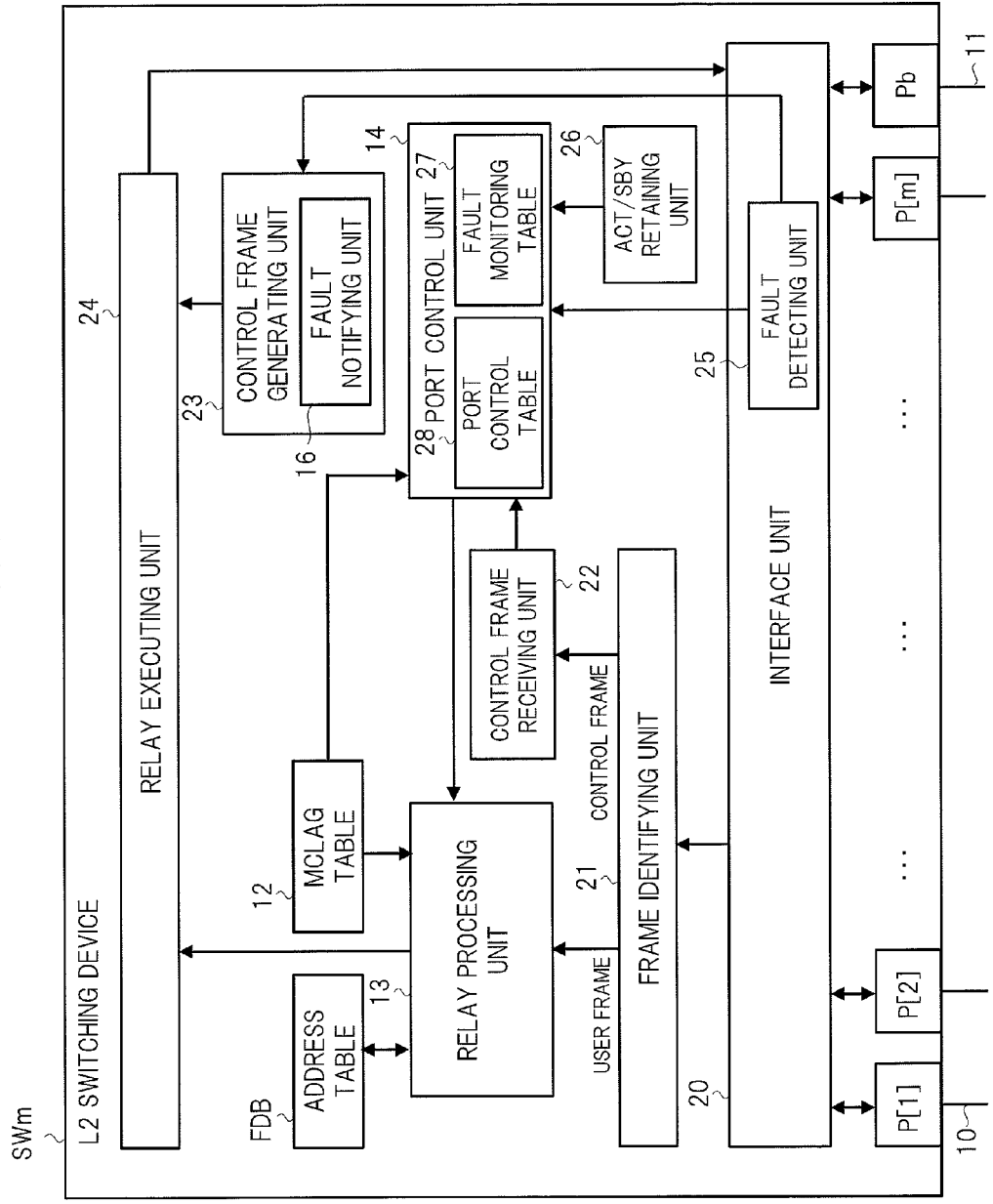
FIG. 7 is a block diagram of a configuration example of the principle part of the L2 switching device constituting the MCLAG device in the relay system of FIG. 1.

FIG. 7 is a block diagram of a configuration example of the principle part of the L2 switching device constituting the MCLAG device in the relay system of FIG. 1. FIG. 8A is a schematic diagram of a configuration example of the address table of FIG. 7. FIG. 8B is a schematic diagram of a configuration example of a fault monitoring table of FIG. 7, and FIG. 8C is a schematic diagram of a configuration example of a port control table of FIG. 7.

The L2 switching device (first or second switching device) SWm shown in FIG. 7 includes a plurality of ports ($P_{[1]}$ to P[m]), the bridge port Pb, various processing units, and various tables. At least one of the plurality of ports (P[1] to P[m]) is a MCLAG port group (MCLAG port) and the rest of the plurality of ports (P[1] to P[m]) may be MCLAG port groups (MCLAG ports) or normal ports on which no MCLAG is set. In this example, for convenience, the ports P[1] and P[2] are assumed to be MCLAG port groups (MCLAG ports) and the port P[m] is assumed to be a normal port. Hereinafter, various processing units and tables will be described.

An interface unit 20 has a reception buffer and a transmission buffer, and transmits and receives a frame (user frame or control frame) to and from the plurality of ports (MCLAG port groups P[1] and P[2] and port P[m]) and the bridge port Pb. When receiving a frame at a port, the interface unit 20 adds a port identifier representing the port having received the frame (i.e., reception port identifier) to the frame. Also, the interface unit 20 has a fault detecting unit 25.

The fault detecting unit 25 takes a part of the function of the fault monitoring unit 15 described with reference to FIG. 1 and others. The fault detecting unit 25 detects the fault occurrence and the recovery from fault at the plurality of ports (MCLAG port groups P[1] and P[2] and port P[m]) and the bridge port Pb with the use of hardware such as a detection circuit of the signal intensity of the received signal and a detection circuit of a pulse signal such as FLP. Also, the fault detecting unit 25 may detect the fault occurrence and the recovery from fault at the plurality of ports (MCLAG port groups P[1] and P[2] and port P[m]) and the bridge port Pb by the use of Ethernet OAM (Operations, Administration, and Maintenance), etc.

A frame identifying unit 21 identifies whether the frame received at the plurality of ports (MCLAG port groups P[1] and P[2] and port P[m]) and the bridge port Pb and transmitted through the reception buffer of the interface unit 20 is a user frame or control frame. The user frame means an ordinary frame such as the frame FL1a of FIG. 2A. The control frame means, for example, the fault notification frame TRf of FIG. 3, the fault recovery frame TRr of FIG. 4A, or the existence-confirming frame regularly transmitted and received between the bridge ports Pb of the MCLAG devices.

Though not particularly limited, the frame identifying unit 21 identifies whether the frame is a user frame or control frame based on frame type and a destination MAC address (e.g., destined for MCLAG device or not) contained in the frame. When the frame is identified as a user frame, the frame identifying unit 21 transmits the user frame to the relay processing unit 13. When the frame is identified as a control frame, the frame identifying unit 21 21 transmits the control frame to a control frame receiving unit 22.

The control frame receiving unit 22 detects the fault occurrence and recovery from fault at each port based on a control frame from the different L2 switching device (referred to as peer device in this specification) constituting the MCLAG device together with its of switching device. Specifically, as shown in FIGS. 3 and 4A, the control frame receiving unit 22 detects the fault occurrence and recovery from fault at the MCLAG port group in the peer device based on the fault notification frame TRf and the fault recovery frame TRr received at the bridge port Pb. Also, the control frame receiving unit 22 takes another part of the function of the fault monitoring unit 15 described with reference to FIG. 1, etc., and detects the fault occurrence and recovery from fault at the bridge port Pb and the peer device itself based on the reception state of the existence-confirming frame regularly received from the peer device as the exertion of the part of the function.

An ACT/SBY retaining unit 26 retains setting information of active ACT or standby SBY in units of device determined in advance by the administrator, etc. The MCLAG table 12 retains each MCLAG port (e.g., P[1]) in association with a MCLAG identifier ({MCLAG1}) as shown in FIG. 1. As described above with reference to FIGS. 1 to 6, the port control unit 14 controls the states of the MCLAG port groups based on information of the MCLAG table 12, information of the control frame receiving unit 22, information of the fault detecting unit 25, and information of the ACT/SBY retaining unit 26.

Specifically, the port control unit 14 has, for example, a fault monitoring table 27 and a port control table 28. As shown in FIG. 8B, the fault monitoring table 27 retains the fault state (e.g., presence and absence of fault) of the MCLAG port (e.g., P[1] and the bridge port Pb of its own switching device (e.g., SWm2) and the fault state of the MCLAG port group of the peer device (SWm1). The fault state of the MCLAG port group of the peer device (SWm1) is retained by using the MCLAG identifier thereof (e.g., {MCLAG1}). The fault state of the MCLAG port and bridge port Pb of its own switching device is determined by a part of the functions of the fault detecting unit 25 and control frame receiving unit 22 of FIG. 7 corresponding to the fault monitoring unit 15 of FIG. 1. The fault state of the MCLAG port group of the peer device is determined by the control frame receiving unit 22 and the MCLAG table 12.

The port control unit 14 controls the states of the MCLAG port groups of its own switching device based on the information of the fault monitoring table 27 and the information of the ACT/SBY retaining unit 26, and manages the control states in the port control table 28. The port control table 28 of FIG. 8C (and the fault monitoring table 27 of FIG. 8B) shows an example of contents retained in the case of the L2 switching device SWm2 of FIG. 3. In the example of the port control table 28 of FIG. 8C, the MCLAG port group P[1] of its own switching device corresponding to the MCLAG identifier {MCLAG1} is controlled to the transmission/reception permitted state FW and the MCLAG port group P[2] of its own switching device corresponding to the MCLAG identifier {MCLAG2} is controlled to the transmission prohibited state TBK.

Figure 9:
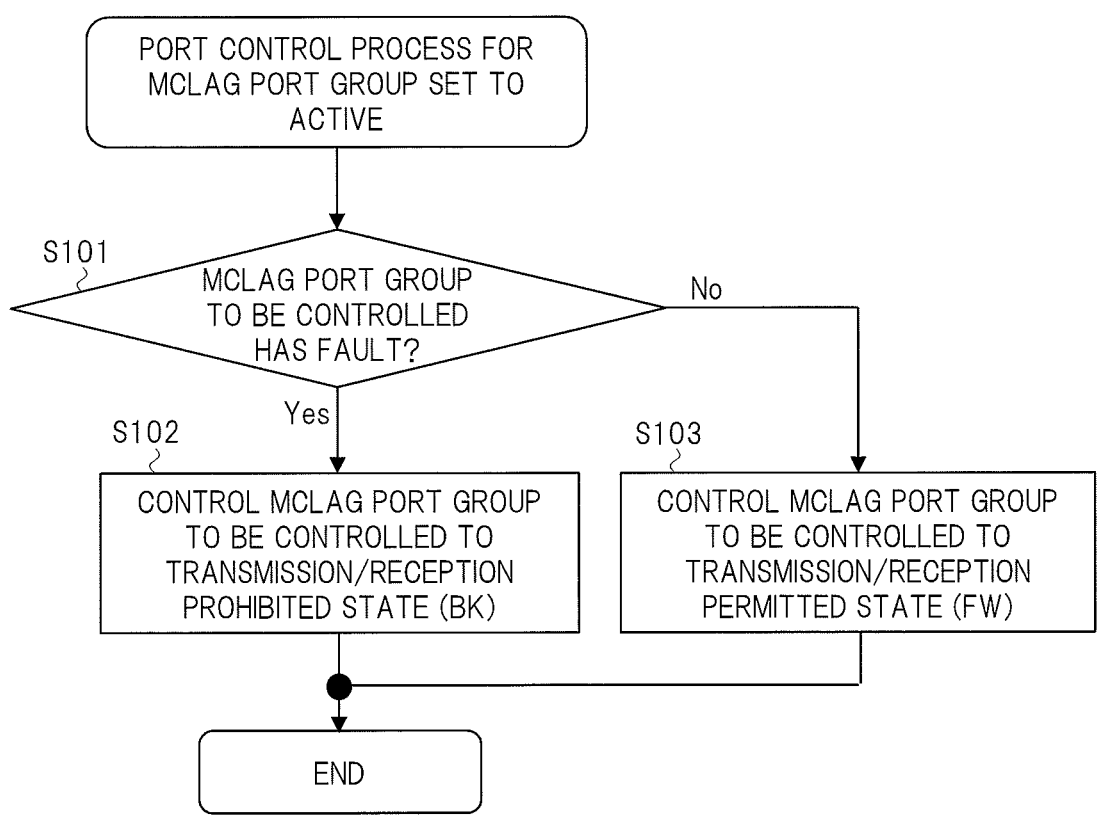
FIG. 9 is a flowchart schematically showing an example of process contents carried out by the port control unit of the L2 switching device of FIG. 7 when the L2 switching device is set to active.

FIG. 9 is a flowchart schematically showing an example of process contents carried out by the port control unit of the L2 switching device of FIG. 7 when the L2 switching device is set to active. In FIG. 9, the port control unit 14 determines whether a MCLAG port group to be controlled has a fault based on the fault monitoring table 27 (specifically, the detection result of the fault detecting unit 25) (step S101). When the MCLAG port group to be controlled has a fault, the port control unit 14 controls the MCLAG port group to the transmission/reception prohibited state BK (step S102). Meanwhile, when the MCLAG port group to be controlled has no fault, the port control unit 14 controls the MCLAG port group to the transmission/reception permitted state FW (step S103).

For example, in the case of the L2 switching device SWm1 of FIG. 3, the MCLAG port groups to be controlled are the MCLAG port groups P[1] and P[2]. Since the MCLAG port group P[1] has a fault, the port control unit 14 controls the MCLAG port group P[1] to the transmission/reception prohibited state BK (step S102). Also, since the MCLAG port group P[2] has no fault, the port control unit 14 controls the MCLAG port group P[2] to the transmission/reception permitted state FW (step S103).

Figure 10:
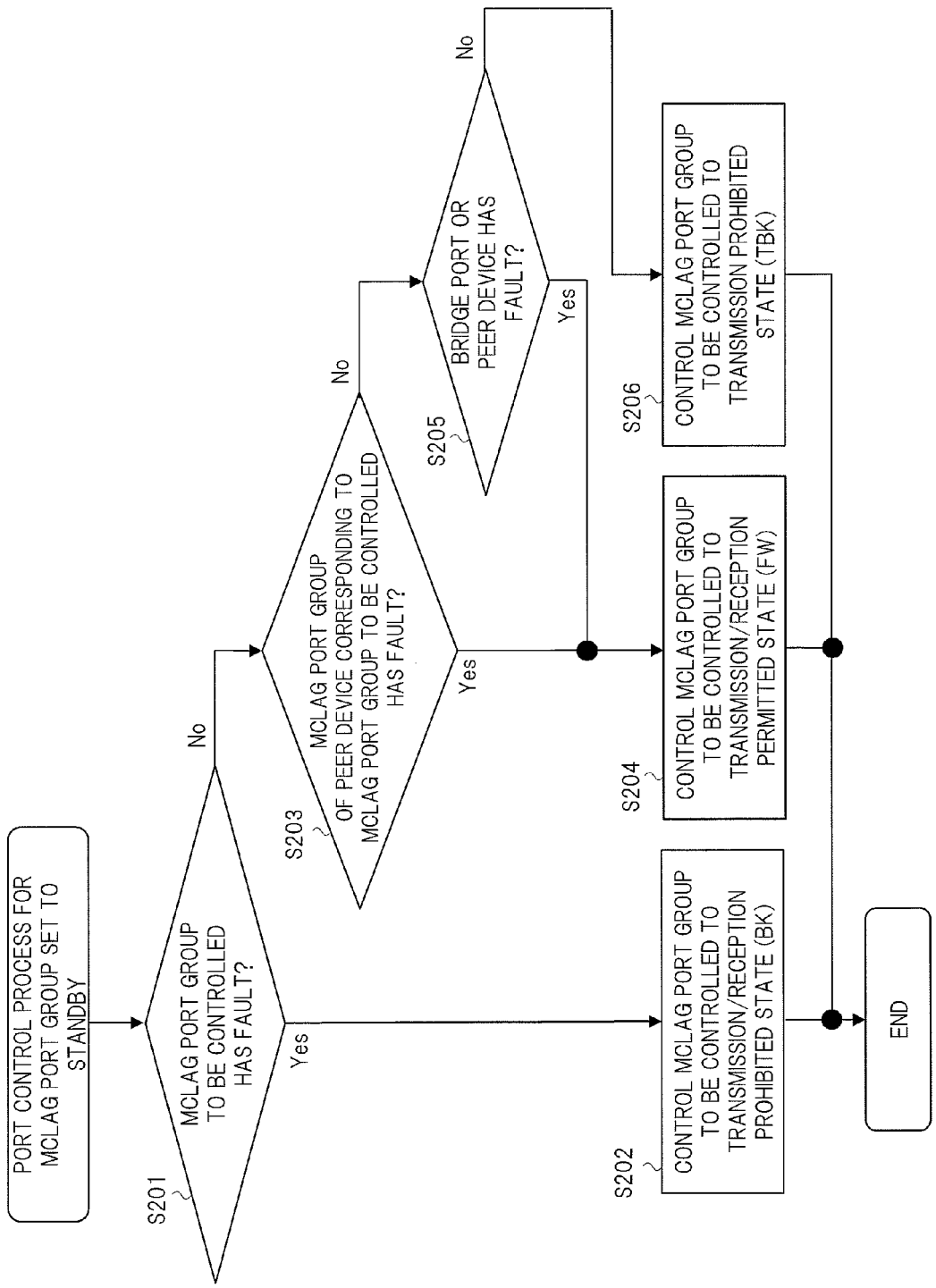
FIG. 10 is a flowchart schematically showing an example of process contents carried out by the port control unit of the L2 switching device of FIG. 7 when the L2 switching device is set to standby.

FIG. 10 is a flowchart schematically showing an example of process contents carried out by the port control unit of the L2 switching device of FIG. 7 when the L2 switching device is set to standby. In FIG. 10, the port control unit 14 determines whether a MCLAG port group to be controlled has a fault based on the fault monitoring table 27 (specifically, the detection result of the fault detecting unit 25) (step S201). When the MCLAG port group to be controlled has a fault, the port control unit 14 controls the MCLAG port group to the transmission/reception prohibited state BK (step S202).

Also, when the MCLAG port group to be controlled has no fault, the port control unit 14 determines whether the MCLAG port group of the peer device corresponding to the MCLAG port group to be controlled has a fault based on the fault monitoring table 27 (specifically, the reception result of fault notification frame/fault recovery frame by the control frame receiving unit 22) (step S203). When the MCLAG port group of the peer device has a fault, the port control unit 14 controls the MCLAG port group to the transmission/reception permitted state FW (step S204).

Also, when the MCLAG port group of the peer device has no fault, the port control unit 14 determines whether the bridge port Pb has a fault based on the fault monitoring table 27 (specifically, the detection result of the fault detecting unit 25 or the reception result of an existence-confirming frame by the control frame receiving unit 22) (step S205). When the bridge port Pb has a fault, the port control unit 14 controls the MCLAG port group to be controlled to the transmission/reception permitted state FW (step S204). Meanwhile, when the bridge port Pb has no fault, the port control unit 14 controls the MCLAG port group to be controlled to the transmission prohibited state TBK (step S206).

For example, in the case of the L2 switching device SWm2 of FIG. 3, the MCLAG port groups to be controlled are the MCLAG port groups P[1] and P[2]. With respect to the MCLAG port groups P[1], the port control. unit 14 recognizes that the MCLAG port group P[1] of its own switching device (SWm2) has no fault and the MCLAG port group P[1] of the peer device (SWm1) has a fault, and therefore, the port control unit 14 controls the MCLAG port group P[1] of its own switching device (SWm2) to the transmission/reception permitted state FW (step S204). Also, with respect to the MCLAG port groups P[2], the port control unit 14 recognizes that any of the MCLAG port group P[2] of its own switching device (SWm2), the MCLAG port group P[2] of the corresponding peer device (SWm1), and the bridge port Pb has no fault, and therefore, the port control unit 14 controls the MCLAG port group P[2] of its own switching device (SWm2) to the transmission prohibited state TBK (step S206).

For example, in the case of the L2 switching device SWm2 of FIG. 5, the MCLAG port groups to be controlled are the MCLAG port groups P[1] and P[2]. With respect to the MCLAG port groups P[1], the port control unit 14 recognizes that the MCLAG port groups P[1] of its own switching device (SWm2) and the peer device (SWm1) have no fault but the bridge port Pb has a fault, and therefore, the port control unit 14 controls the MCLAG port group P[1] of its own switching device (SWm2) to the transmission/reception permitted state FW (step S204). Similarly, with respect to the MCLAG port groups P[2], the port control unit 14 recognizes that the MCLAG port groups P[2] of its own switching device (SWm2) and the peer device (SWm1) have no fault but the bridge port Pb has a fault, and therefore, the port control unit 14 controls the MCLAG port group P[2] of its own switching device (SWm2) to the transmission/reception permitted state FW (step S204).

Figure 11:
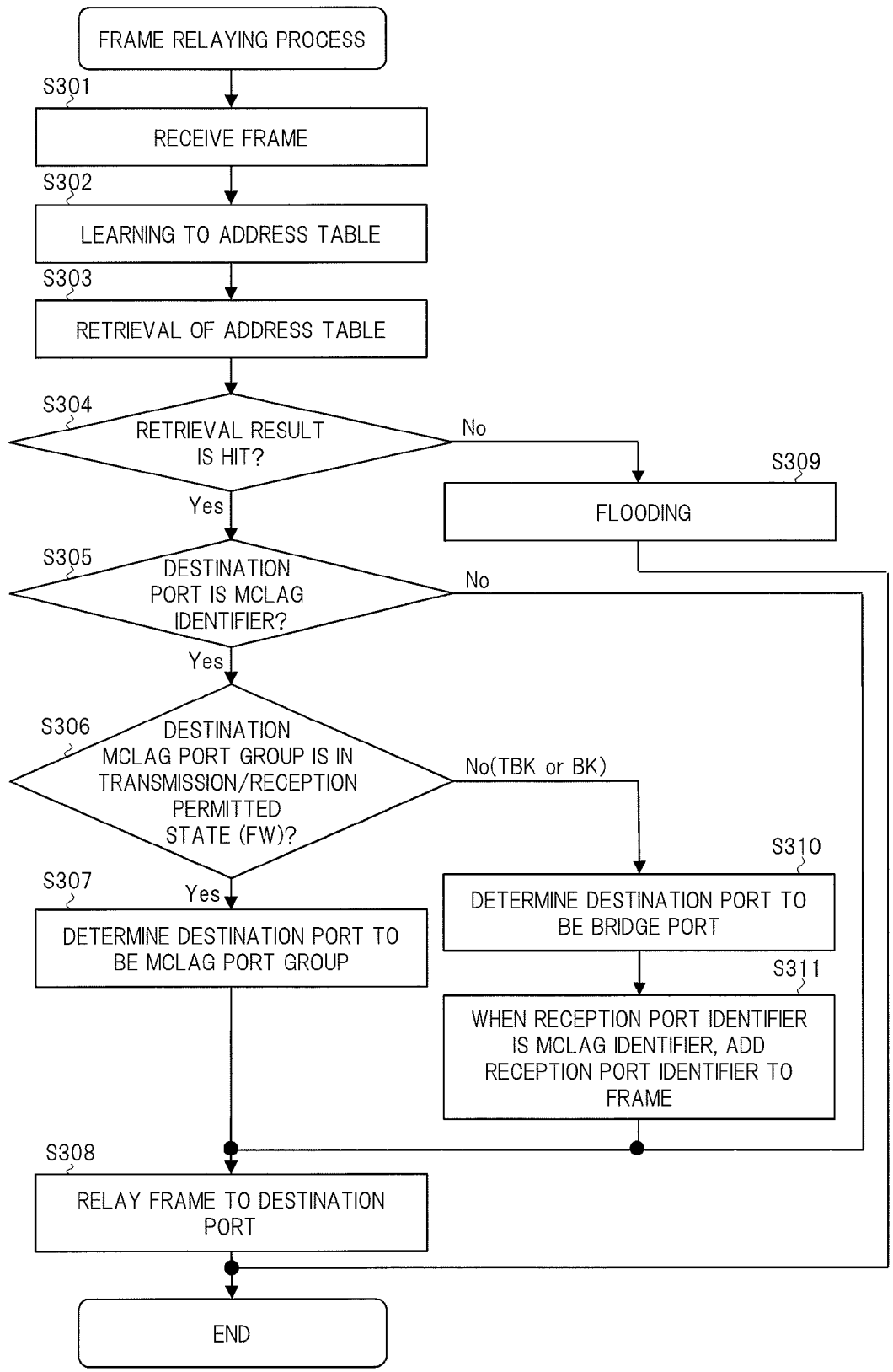
FIG. 11 is a flowchart schematically showing an example of process contents carried out by the relay processing unit of the L2 switching device of FIG. 7.

In FIG. 7, the relay processing unit 13 determines a destination port for a user frame from the frame identifying unit 21 by performing the learning and retrieval on the address table FDB and reflecting information of the port control unit 14 (specifically, the port control table 28) as described above with reference to FIGS. 1 to 6. FIG. 11 is a flowchart schematically showing an example of process contents carried out by the relay processing unit of the L2 switching device of FIG. 7. In FIG. 11, the relay processing unit 13 receives a frame (user frame) from the frame identifying unit 21 (step S301) and learns a source MAC address thereof in association with a reception port identifier to the address table FDB (step S302).

As described above, the reception port identifier is added to the frame by the interface unit 20. However, when the reception port identifier is a port identifier of a MCLAG port (e.g., {P[1]}) based on the MCLAG table 12, the relay processing unit 13 learns the MCLAG identifier ({MCLAG1}) of the MCLAG port in place of the reception port identifier to the address table FDB. Furthermore, as described above with reference to FIG. 1, etc., when a frame to which a reception port identifier has already been added is received at the bridge port Pb, the relay processing unit 13 learns a source MAC address contained in the frame in association with the reception port identifier to the address table FDB.

As a result, the address table FDB retains the correspondence relation between the ports and the MAC addresses present ahead of the ports as shown in FIG. 8A. In FIG. 8A, a port is retained as the port identifier thereof (e.g., (P[m]) or the MCLAG identifier thereof (e.g., {MCLAG1}). Actually, the address table FDB retains VLAN (Virtual Local Area Network) identifiers in addition to MAC addresses.

Subsequently, the relay processing unit 13 performs the retrieval on the address table FDB with using a destination MAC address (and a VAN identifier) of the frame as a retrieval key, thereby acquiring a destination port (step S303). When the retrieval result is hit (step S304), the relay processing unit 13 determines whether the destination port is a MCLAG identifier (step S305). When the destination port is a MCLAG identifier, the relay processing unit 13 determines whether the destination MCLAG port group corresponding to the MCLAG identifier is in the transmission/reception permitted state FW based on the information of the port control unit 14 (specifically, the port control table 28) (step S306).

When the destination MCLAG port group is in the transmission/reception permitted state FW, the relay processing unit 13 determines the destination port to be the destination MCLAG port group (MCLAG port) (step S307). The relay processing unit 13 then relays the frame to the destination port (step S308). Specifically, the relay processing unit 13 adds the port identifier (that is, destination port identifier) representing the destination port (e.g., {P[1]}) to the frame and relays the frame to a relay executing unit 24.

Meanwhile, when the destination MCLAG port group is not in the transmission/reception permitted state FW (that is, in the transmission prohibited state TBK or transmission/reception prohibited state BK) at step S306, the relay processing unit 13 determines the destination port to be the bridge port Pb (step S310). Furthermore, when the reception port identifier is a MCLAG identifier, the relay processing unit 13 adds the reception port identifier (MCLAG identifier) to the frame (step S311). The relay processing unit 13 then relays the frame, to which the reception port identifier is added, to the destination port (step S308). Specifically, the relay processing unit 13 further adds the destination port identifier (Pb) to the frame and then relays the frame to the relay executing unit 24.

Also, when the retrieval result of the address table FDB is mishit at step S304, the relay processing unit 13 floods the frame in a VLAN to which the frame belongs (step S309). For example, the case in which the retrieval result with respect to the frame FL1*c* in the L2 switching device SWm2 is mishit in FIG. 2B is assumed. In this case, the relay processing unit 13 of the L2 switching device SWm2 determines the ports (P[1] and Pb) other than the MCLAG port group P[2] (i.e., the port having received the frame FL1c) to be the candidates for flooding. However, since the MCLAG port group P[1] is in the transmission prohibited state TBK, the relay processing unit 13 floods the frame FL1c to the bridge port Pb.

Meanwhile, when the retrieval result is mishit, the relay processing unit 13 of the L2 switching device SWm1 having received the frame FL1c at the bridge port Pb determines be port (P[1]) other than the port (Pb) having received the frame FL1c and the MCLAG port group (P[2]) corresponding to the reception port identifier ({MCLAG2}) added to the frame FL1c to be the candidate for flooding. Since the MCLAG port group P[1] is in the transmission/reception permitted state FW, the relay processing unit 13 floods the frame FL1c to the MCLAG port group P[1].

In this manner, the relay processing unit 13 prevents the looping back of the frame FL1c in the MCLAG2 based on the reception port identifier ({MCLAG2}) added to the frame FL1c. Furthermore, since one of the MCLAG port groups of each L2 switching device constituting the MCLAG device is controlled to the transmission prohibited state TBK except for the case where a fault occurs at the bridge port Pb in the first embodiment, the duplicate transmission of frames in the MCLAG does not occur.

Also, when the destination port is not a MCLAG identifier at step S305 of FIG. 11, the relay processing unit 13 relays the frame to the destination port acquired as the retrieval result of the address table FDB (step S308). Specifically, the relay processing unit 13 adds the destination port identifier representing the destination. port to the frame and relays the frame to the relay executing unit 24. Note that the case where the destination port is not a MCLAG identifier corresponds to, for example, the case where the destination port is a normal port (P[m] in this example).

In FIG. 7, a control frame generating unit 23 has the fault notifying unit 16. The fault notifying unit 16 generates the fault notification frame TRf described with reference to FIG. 3 and the fault recovery frame TRr described with reference to FIGS. 4A and 4B based on the detection result of the fault detecting unit 25. The control frame generating unit 23 generates the existence-confirming frame in addition to these frames. For example, the control frame generating unit 23 adds the destination port identifier ({Pb}) of the bridge port Pb to a generated frame and transmits the frame to the relay executing unit 24.

The relay executing unit 24 transmits a frame (user frame or control frame) from the relay processing unit 13 or the control flame generating unit 23 to the predetermined transmission buffer in the interface unit 20. This predetermined transmission buffer corresponds to a destination port identifier added to the frame. Upon reception of the frame from the relay executing unit 24, the transmission buffer in the interface unit 20 transmits the frame to the corresponding port.

In the configuration example of FIG. 7, the case where the retained contents of the address tables FDB are different from each other between one MCLAG device (SWm1) and the other MCLAG device (SWm2) (that is, the case where an entry present in one address table FDB is not present in the other address table FDB) may arise. Even in such a case, the malfunction does not occur by performing the flooding. However, in order no suppress communication congestion due to the flooding, a mechanism to synchronize the retained contents of the address tables FDB may be provided.

As described above, by using the relay system and the switching device of the first embodiment typically, network management can be facilitated.

Second Embodiment

<<General Configuration of Relay System (application example)>>

Figure 12:
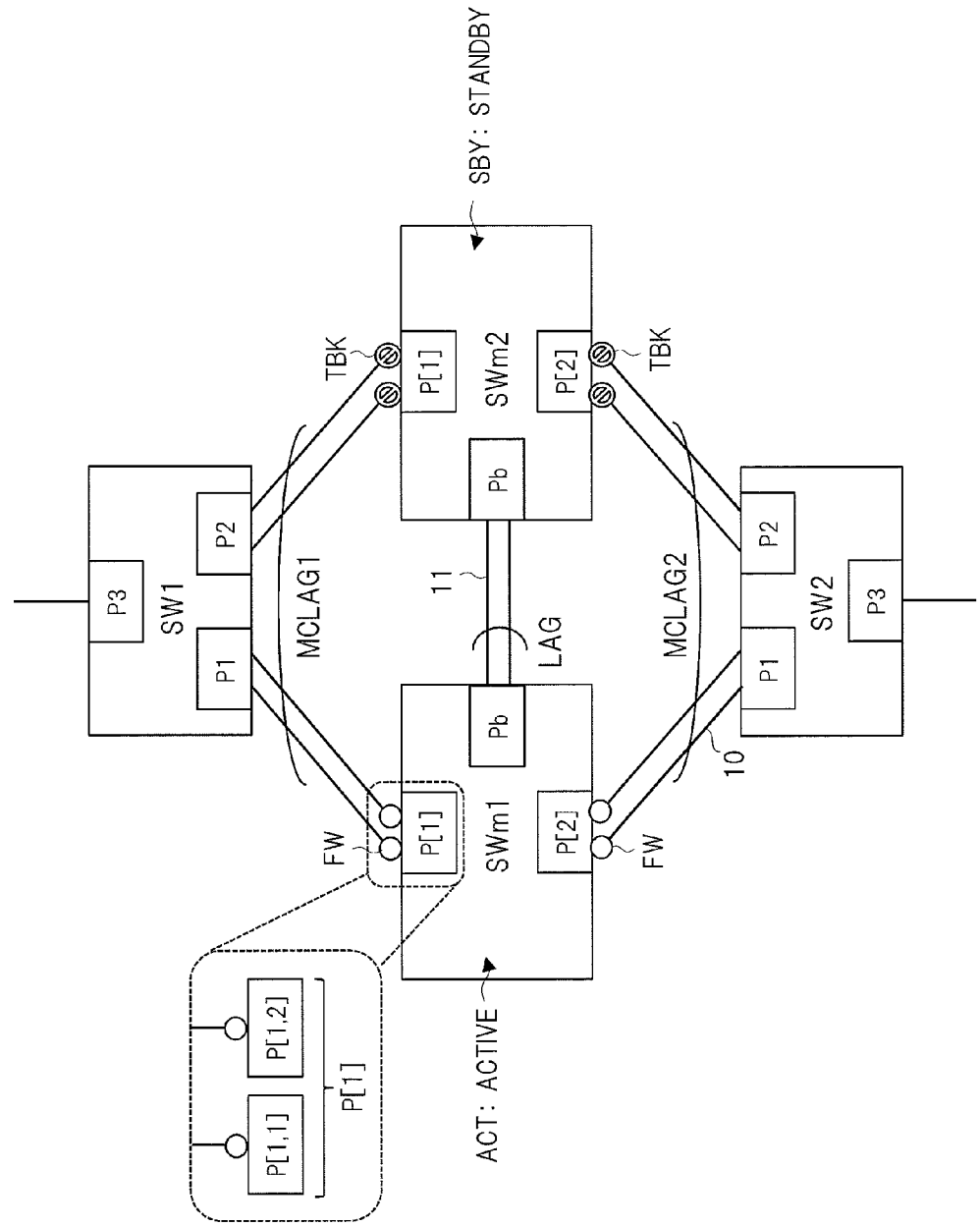
FIG. 12 is a schematic diagram of a configuration example of a relay system according to the second embodiment of the present invention.

FIG. 12 is a schematic diagram of a configuration example of a relay system according to the second embodiment of the present invention. The relay system of FIG. 12 is different from the relay system of FIG. 1 in that each of the MCLAG port groups P[1] and P[2] of the MCLAG device is made up of a plurality of (two) MCLAG ports and the bridge port PB is also made up of a plurality of (two) bridge ports. Consequently, switching devices are connected via a plurality of communication lines 10. As a typical example thereof, in FIG. 12, the MCLAG port group (first port group) P[1] is made up of two MCLAG ports (first ports) P[1,1] and P[1,2], and the two MCLAG ports P[1,1] and P[1,2] are connected to the L2 switching device SW1 via the communication lines 10, respectively.

The MCLAG1 is set on the MCLAG ports P[1,1] and P[1,2] of the L2 switching device SWm1 and on the MCLAG ports P[1,1] and P[1,2] of the L2 switching device SWm2. Similarly, the MCLAG2 is set on the four MCLAG ports corresponding to the MCLAG port groups P[2] of the L2 switching devices SWm1 and SWm2 (MCLAG ports P[2,1] and P[2,2] of SWm1 and SWm2 (not shown)). Further, the LAG is set on the plurality of bridge ports constituting the bridge port Pb.

Like the case of FIG. 1, the MCLAG port groups P[1] and P[2] of the L2 switching device SWm1 are controlled to the transmission/reception permitted state FW, and the MCLAG port groups P[ ] and P[2] of the L2 switching device SWm2 are controlled to the transmission prohibited state TBK. More specifically, each of the MCLAG ports P[1,1] and P[1,2] (and P[2,1] and P[2,2]) of the L2 switching device SWm1 is controlled to the transmission/reception permitted state FW, and each of the MCLAG ports P[1,1] and P[1,2] (and P[2,1] and P[2,2]) of the L2 switching device SWm2 is controlled to the transmission prohibited state TBK.

The relay system of FIG. 12 operates in the same manner as the relay system of the first embodiment. For example, by properly determining what state of fault occurrence at the MCLAG ports P[1,1] and P[1,2] is to be regarded as the fault occurrence at the MCLAG port group P[1] shown in FIG. 3, the relay system of FIG. 12 operates in the same manner as that of the relay system of the first embodiment. For example, the fault occurrence at one of the MCLAG ports P[1,1] and P[1,2] may be regarded as the fault occurrence at the MCLAG port group P[1], and the fault occurrence at both of the MCLAG ports P[1,1] and P[1,2] may also be regarded as the fault occurrence at the MCLAG port group P[1].

For example, the case in which a fault occurs at the MCLAG port P[1,1] of the L2 switching device SWm1 in the former case is assumed. In this case, the MCLAG port P[1,2] of the L2 switching device SWm1 is also control led to the transmission/reception prohibited state BK together with the MCLAG port P[1,1], and the MCLAG ports P[1,1] and P[1,2] of the L2 switching device SWm2 are both controlled to the transmission/reception permitted state FW. Meanwhile, the case in which a fault occurs at the MCLAG port P[1,1] of the L2 switching device SWm1 in the latter case Is assumed. In this case, the MCLAG port P[1,2] of the L2 switching device SWm1 remains in its transmission/reception permitted state FW, and the MCLAG ports P[1,1] and P[1,2] of the L2 switching device SWm2 remain in their transmission prohibited state TBK.

<<Configuration of Switching Device (application example)>>

Figure 13:
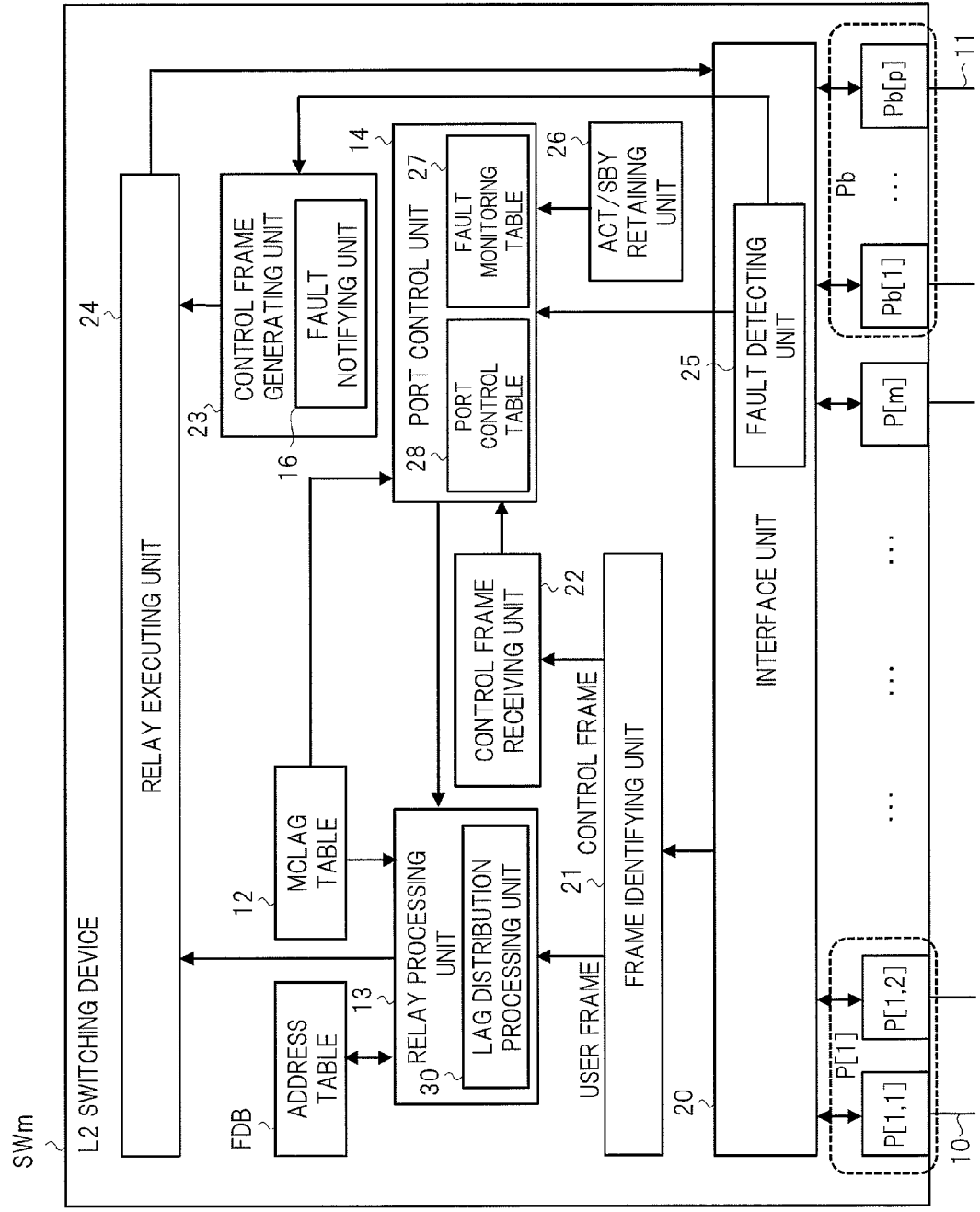
FIG. 13 is a block diagram of a configuration example of the principle part of the L2 switching device constituting the MCLAG device in the relay system of FIG. 12.

FIG. 13 is a block diagram of a configuration example of the principle part of the L2 switching device constituting the MCLAG device in the relay system of FIG. 12. The L2 switching device (first or second switching device) SWm of FIG. 13 is different from the configuration example shown in FIG. 7 in the following respects. First, in FIG. 13, the MCLAG port group P[1] is made up of a plurality of MCLAG ports P[1,1] and P[1,2] and the bridge port Pb is also made up of a plurality of bridge ports Pb [1] to Pb [p]. Secondly, in FIG. 13, the relay processing unit 13 has a LAG distribution processing unit 30. Since the configuration and operation other than these respects are the same as those of the case of FIG. 7, detailed descriptions thereof are omitted.

For example, when relaying a frame to the MCLAG port group P[1], the L2 switching device SWm of FIG. 13 selects one of the MCLAG ports P[1,1] and P[1,2] by using the LAG distribution processing unit 30. For example, the case in which a destination port of a frame received at a predetermined port is the MCLAG identifier {MCLAG1} based on the retrieval result of the address table FDB by the relay processing unit 13 is assumed. It is also assumed in this case that the MCLAG ports P[1,1] and P[1,2] are controlled to the transmission/reception permitted state FW.

In this case, the LAG distribution processing unit 30 recognizes that its own MCLAG ports to be the member ports of the MCLAG identifier {MCLAG1} are the MCLAG ports P[1, 1] and P[1,2] based on the MCLAG table 12. The LAG distribution processing unit 30 then performs a hash operation by using, for example, a source MAC address, a destination MAC address, etc., of the frame, and selects one of the MCLAG ports P[1,1] and P[1,2] based on the result of the hash operation. The LAG distribution processing unit 30 adds a destination port identifier representing the selected port to the frame, and transmits the frame to the relay executing unit 24.

As described above, by using the relay system and the switching device of the second embodiment, the improvement in a communication band obtained by using a plurality of communication lines based on LAG (or MCLAG) for the connection between devices and the further improvement in availability can be achieved in addition to the various effects described in the first embodiment.

Third Embodiment

<<General Configuration of Relay System (modification example)>>

Figure 14:
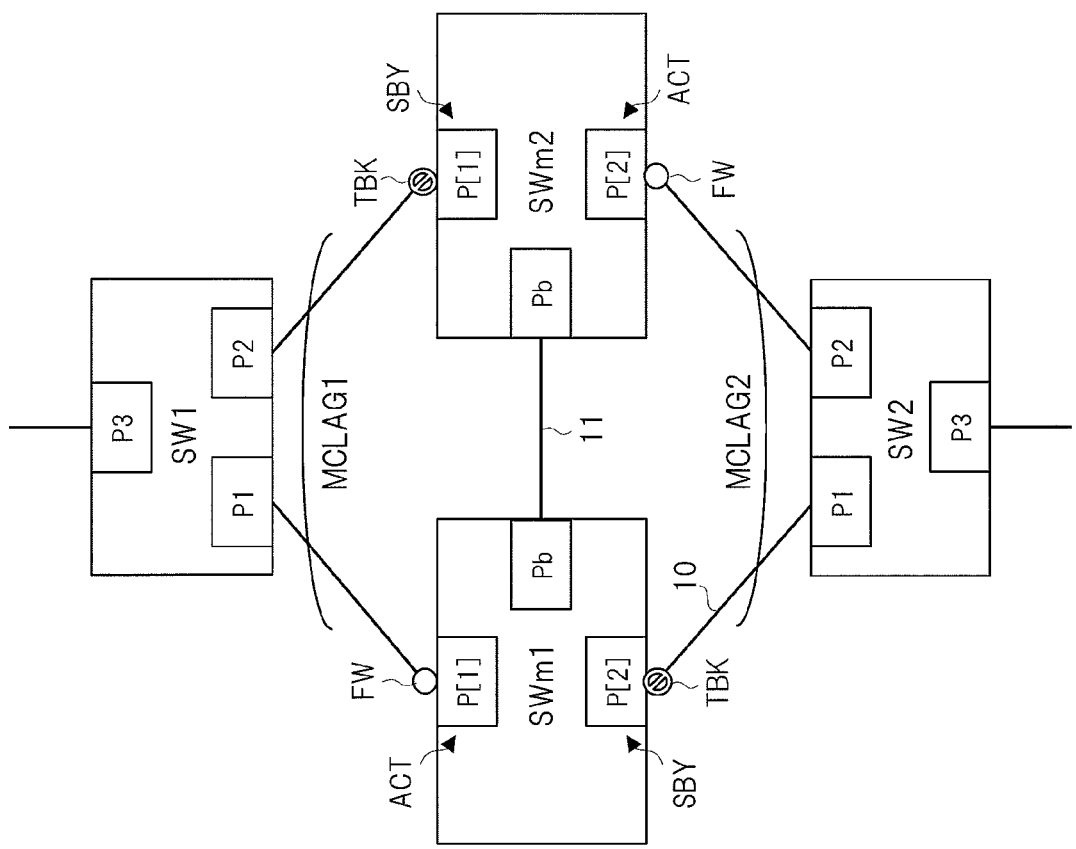
FIG. 14 is a schematic diagram of a configuration example of a relay system according to the third embodiment of the present invention.

FIG. 14 is a schematic diagram of a configuration example of a relay system according to the third embodiment of the present invention. The relay system of FIG. 14 is different from the relay system of FIG. 1 in that active ACT/standby SBY is set in units of MCLAG port group instead of in units of device. For example, the ACT/SBY retaining unit 26 of FIG. 7 retains setting information of active ACT or standby SBY in units of MCLAG port group determined in advance by the administrator, etc.

In the example of FIG. 14, the MCLAG port group P[1] of the L2 switching device SWm1 is set to active ACT, and is therefore controlled to the transmission/reception permitted state FW. Meanwhile, the MCLAG port group P[1] of the L2 switching device SWm2 is set to standby SBY, and is therefore controlled to the transmission. prohibited state TBK. Also, the MCLAG port group P[2] of the L2 switching device SWm1 is set to standby SBY, and is therefore controlled to the transmission prohibited state TBK. Meanwhile, the MCLAG port group P[2] of the L2 switching device SWm2 s set to active ACT, and is therefore controlled to the transmission/reception. permitted state FW.

<<General Operation of Relay System (modification example) (in the absence of fault)>>

Figure 15A:
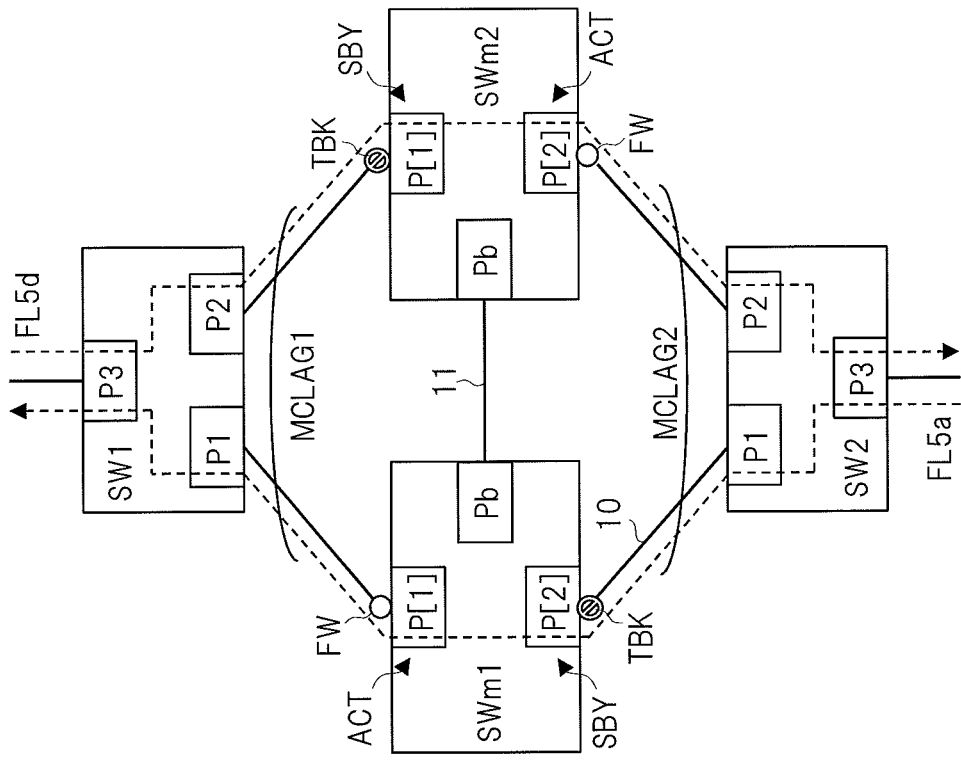
FIG. 15A is an explanatory diagram schematically showing an operation example in the absence of fault in the relay system of FIG. 14.
Figure 15B:
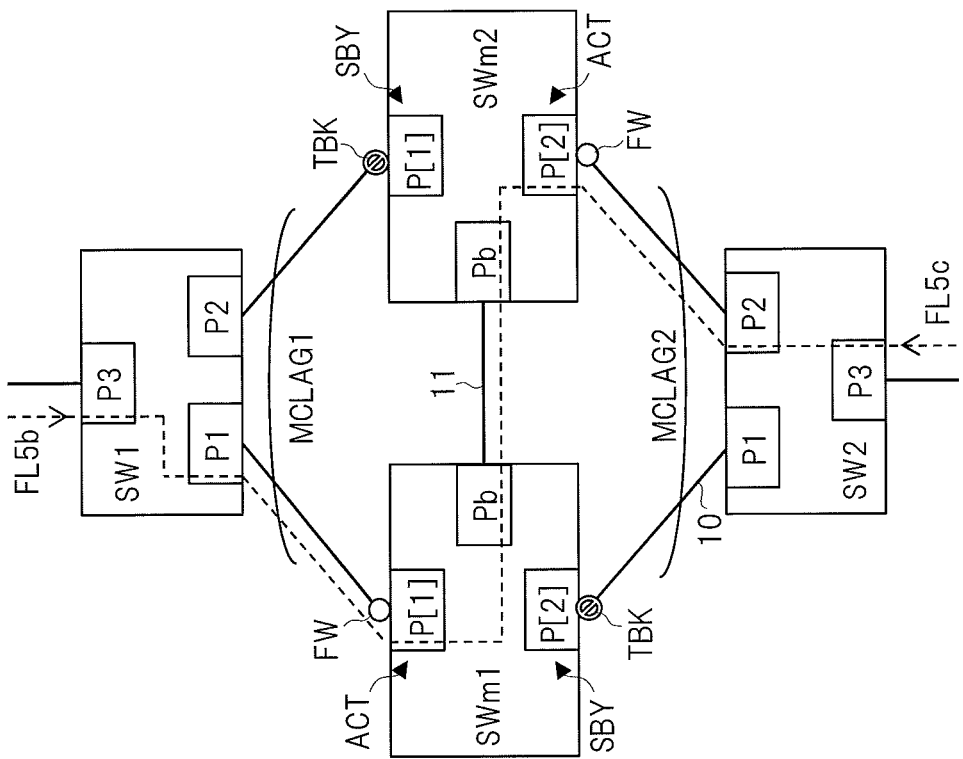
FIG. 15B is an explanatory diagram schematically showing an operation example in the absence of fault in the relay system of FIG. 14.

FIGS. 15A and 15B are explanatory diagrams schematically showing operation examples in the absence of fault in the relay system of FIG. 14. Here, the case in which a frame is transmitted and received between the terminal connected to the port P3 of the user L2 switching device SW1 and the terminal connected to the port P3 of the user L2 switching device SW2 like the cases of FIGS. 2A and 2B is taken as an example. Note that, since operations such as the learning and the retrieval on the address table FDB are the same as those in the examples of FIGS. 2A and 2B, the following descriptions will be focused on a frame path.

First, the case in which the user L2 switching device SW2 relays a frame FL5a received at the port P3 to the LAG port P1 is assumed. In this case, since the MCLAG port group P[1] of the L2 switching device SWm1 is controlled to the transmission/reception permitted state FW, the frame FL5a is transferred through a path leading from the L2 switching device SWm1 to the L2 switching device SW1 as shown in FIG. 15b.

Then, the case in which the user L2 switching device SW1 relays a frame FL5b received at the port P3 to the LAG port P1 in reverse is assumed. As shown in FIG. 15A, the MCLAG port group P[2] of the L2 switching device SWm1 is controlled to the transmission prohibited state TBK, and the MCLAG port group P[2] of the L2 switching device SWm2 is controlled to the transmission/reception permitted state FW. Therefore, the frame FL5b is transferred through a path leading from the L2 switching device SWm1 via the L2 switching device SWm2 to the L2 switching device SW2.

Next, the case in which the user L2 switching device SW2 relays a frame FL5c received at the port P3 to the LAG port P2 is assumed. As shown in FIG. 15A, the MCLAG port group P[1] of the L2 switching device SWm2 is controlled to the transmission prohibited state TBK, and the MCLAG port group P[1] of the L2 switching device SWm1 is controlled to the transmission/reception permitted state FW. Therefore, the frame FL5c is transferred through a path leading from the L2 switching device SWm2 via the L2 switching device SWm1 to the L2 switching device SW1.

Then, the case in which the user L2 switching device SW1 relays a frame FL5d received at the port P3 to the LAG port P2 in reverse is assumed. In this case, since the MCLAG port group P[2] of the L2 switching device SWm2 is controlled the transmission/reception permitted state FW, the frame FL5d is transferred through a path leading from the L2 switching device SWm2 to the user L2 switching device SW2 as shown in FIG. 15B.

As can be seen from FIGS. 15A and 15B, when a frame is monitored by, for example, port mirroring, it is only required to monitor the MCLAG port groups set to active ACT (P[1] of SWm1 and P[2] of SWm2) like the cases of FIG. 2A and FIG. 2B. Therefore, also in the third embodiment, network management can be facilitated like the case of the first embodiment.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A relay system comprising:
a first switching device and a second switching device each having a first port group made up of one or a plurality of first ports, a second port and a bridge port, the first switching device and the second switching device being connected to each other by a communication line via the bridge ports; and
a third switching device connected to the one or the plurality of first ports of the first switching device and the one or the plurality of first ports of the second switching device via different communication lines, the third switching device setting a link aggregation group on ports serving as connection sources of the communication lines,
wherein each of the first switching device and the second switching device includes:
a MCLAG table which retains the one or the plurality of first ports in association with a first identifier;
a port control unit which controls the first port group to a first state in which transmission and reception are both permitted when no fault is present and the first port group is set to active and controls the first port group to a second state in which reception is permitted but transmission is prohibited when no fault is present and the first port group is set to standby; and
a relay processing unit which relays a frame containing the first identifier as a destination port to the first port group when the first port group is controlled to the first state and relays a frame containing the first identifier as a destination port to the bridge port when the first port group is controlled to the second state,
the first port group of the first switching device is set to the active and the first port group of the second switching device is set to the standby, and
when no fault is present, a frame containing the first identifier as a destination port and received at the second port of the first switching device is relayed to the first port group of the first switching device, and a frame containing the first identifier as a destination port and received at the second port of the second switching device is relayed to the first port group of the first switching device via the bridge port.

2. The relay system according to claim 1,
wherein each of the first switching device and the second switching device further includes:
a fault monitoring unit which detects a fault occurrence and a recovery from fault at the first port group, the second port, and the bridge port of its own switching device; and
a fault notifying unit which transmits a fault notification frame via the bridge port when the fault monitoring unit detects a fault occurrence at the first port group,
when the fault monitoring unit detects a fault occurrence at the first port group, the port control unit controls the first port group to a third state in which transmission and reception are both prohibited, and when the fault monitoring unit detects no fault occurrence at the first port group and the fault notification frame is received via the bridge port, the port control unit controls the first port group to the first state,
when the first port group is controlled to the third state, the relay processing unit relays a frame containing the first identifier as a destination port to the bridge port, and
when a fault occurrence at the first port group of the first switching device is detected, a frame containing the first identifier as a destination port and received at the second port of the first switching device is relayed to the first port group of the second switching device via the bridge port, and a frame containing the first identifier as a destination port and received at the second part of the second switching device is relayed to the first port group of the second switching device.

3. The relay system according to claim 2,
wherein, when the fault monitoring unit detects a recovery from fault at the first port group, the fault notifying unit transmits a fault recovery frame via the bridge port,
when the first port group is set to the active and the fault monitoring unit detects a recovery from fault at the first port group, the port control unit controls the first port group to the first state, and when the first port group is set to the standby and the fault recovery frame is received via the bridge port, the port control unit controls the first port group to the second state, and
when a recovery from fault at the first port group of the first switching device is detected, a frame containing the first identifier as a destination port and received at the second port of the first switching device is relayed to the first port group of the first switching device, and a frame containing the first identifier as a destination port and received at the second port of the second switching device is relayed to the first port group of the first switching device via the bridge port.

4. The relay system according to claim 2,
wherein, when the fault monitoring unit detects a fault occurrence at the bridge port, the port control unit controls the first port group to the first state, and
when the fault monitoring unit detects a fault occurrence at the bridge port, a frame containing the first identifier as a destination. port and received at the second port of the first switching device is relayed to the first port group of the first switching device, and a frame containing the first identifier as a destination port and received at the second port of the second switching device is relayed to the first port group of the second switching device.

5. The relay system according to claim 1,
wherein each of the first switching device and the second switching device includes a second port group made up of one or a plurality of the second ports,
the relay system further comprises a fourth switching device connected to the one or the plurality of second ports of the first switching device and the one or the plurality of second ports of the second switching device via different communication lines, the fourth switching device setting a link aggregation on ports serving as connection sources of the communication lines,
the MCLAG table retains the one or the plurality of second ports in association with a second identifier,
the second port group of the first switching device is set to the active and the second port group of the second switching device is set to the standby, and
when no fault is present, a frame containing the second identifier as a destination port and received at the first port group of the first switching device is relayed to the second port group of the first switching device, and a frame containing the second identifier as a destination port and received at the first port group of the second switching device is relayed to the second port group of the first switching device via the bridge port.

6. The relay system according to claim 5,
wherein each of the first switching device and the second switching device further includes an address table retaining a correspondence relation between a port and a MAC address present ahead of the port,
when a frame is received at the first port group, the relay processing unit determines the first identifier to be a reception port identifier, and learns a source MAC address contained in the frame in association with the reception port identifier to the address table,
when a destination port corresponding to a destination MAC address contained in the frame is the second identifier based on retrieval on the address table and the second port group is controlled to the second state, the relay processing unit relays a frame, to which the reception port identifier is added, to the bridge port, and
when the frame to which the reception port identifier is added is received at the bridge port, the relay processing unit learns a source MAC address contained in the frame in association with the reception port identifier added to the frame to the address table.

7. A switching device having a first port group made up of one or a plurality of first ports, a second port and a bridge port and connected to a different switching device via the bridge port, the switching device comprising:
a MCLAG table which retains the one or the plurality of first ports in association with a first identifier;
a port control unit which controls the first port group to a first state in which transmission and reception are both permitted when no fault is present and the first port group is set to active and controls the first port group to a second state in which reception is permitted but transmission is prohibited when no fault is present and the first port group is set to standby; and
a relay processing unit which relays a frame containing the first identifier as a destination port to the first port group when the first port group is controlled to the first state and relays a frame containing the first identifier as a destination port to the bridge port when the first port group is controlled to the second state,
wherein one of the first port group of the switching device and a first port group of the different switching device is set to the active, and the other thereof is set to the standby.

8. The switching device according to claim 7, further comprising:
a fault monitoring unit which detects a fault occurrence and a recovery from fault at the first port group, the second port, and the bridge port of its own switching device; and
a fault notifying unit which transmits a fault notification frame via the bridge port when the fault monitoring unit detects a fault occurrence at the first port group, wherein, when the fault monitoring unit detects a fault occurrence at the first port group, the port control unit controls the first port group to a third state in which transmission and reception are both prohibited, and when the fault monitoring unit detects no fault occurrence at the first port group and the fault notification frame is received at the bridge port, the port control unit controls the first port group to the first state, and
when the first port group is controlled to the third state, the relay processing unit relays a frame containing the first identifier as a destination port to the bridge port.

9. The switching device according to claim 8,
wherein, when the fault monitoring unit detects a recovery from fault at the first port group, the fault notifying unit transmits a fault recovery frame via the bridge port,
when the first port group is set to the active and the fault monitoring unit detects a recovery from fault at the first port group, the port control unit controls the first port group to the first state, and when the first port group is set to the standby and the fault recovery frame is received via the bridge port, the port control unit controls the first port group to the second state.

10. The switching device according to claim 8,
wherein, when the fault monitoring unit detects a fault occurrence at the bridge port, the port control unit controls the first port group to the first state.

11. The switching device according to claim 7, further comprising:
a second port group made up of one or a plurality of the second ports,
wherein the MCLAG table retains the one or the plurality of second ports in association with a second identifier, and
the second port group is set to the active when the first port group is set to the active, and the second port group is set to the standby when the first port group is set to the standby.

12. The switching device according to claim 11, further comprising:
an address table retaining a correspondence relation between a port and a MAC address present ahead of the port,
wherein, when a frame is received at the first port group, the relay processing unit determines the first identifier to be a reception port identifier, and learns a source MAC address contained in the frame in association with the reception port identifier to the address table,
when a destination port corresponding to a destination MAC address contained in the frame is the second. identifier based on retrieval on the address table and the second port group is controlled, to the second state, the relay processing unit relays a frame, to which the reception port identifier is added, to the bridge port, and
when the frame to which the reception port identifier is added is received at the bridge port, the relay processing unit learns a source MAC address contained in the from in association with the reception port identifier added to the frame to the address table.

* * * * *